United States Patent
Kernick et al.

(10) Patent No.: US 11,334,525 B2
(45) Date of Patent: May 17, 2022

(54) SELECTING APPLICATION DATA FOR DELETION FROM MEMORY OF A CLIENT DEVICE

(71) Applicant: Planet Social, LLC, Austin, TX (US)

(72) Inventors: Kristina Kernick, Johnson City, TX (US); Katherine C. Stuckman, San Francisco, CA (US); Bruce Edward Stuckman, Austin, TX (US)

(73) Assignee: Planet Social, LLC, Austin, TX (US)

( * ) Notice: Subject to any disclaimer, the term of this patent is extended or adjusted under 35 U.S.C. 154(b) by 353 days.

(21) Appl. No.: 16/541,358

(22) Filed: Aug. 15, 2019

(65) Prior Publication Data
US 2021/0049128 A1    Feb. 18, 2021

(51) Int. Cl.
| | |
|---|---|
| *G06F 7/00* | (2006.01) |
| *G06F 16/16* | (2019.01) |
| *G06F 16/174* | (2019.01) |
| *H04L 67/1097* | (2022.01) |
| *H04L 67/01* | (2022.01) |
| *G06V 40/16* | (2022.01) |
| *G06Q 50/00* | (2012.01) |

(52) U.S. Cl.
CPC ........ *G06F 16/162* (2019.01); *G06F 16/1748* (2019.01); *G06V 40/161* (2022.01); *H04L 67/1097* (2013.01); *H04L 67/42* (2013.01); *G06Q 50/01* (2013.01)

(58) Field of Classification Search
CPC .............. G06F 16/162; G06F 16/1748; G06K 9/00228; H04L 67/1097; H04L 67/42; G06Q 50/01
USPC .................................................. 707/600–899
See application file for complete search history.

(56) References Cited

U.S. PATENT DOCUMENTS

2015/0350266 A1* 12/2015 O'Brien ................ H04W 4/021
                                                709/204

* cited by examiner

*Primary Examiner* — Isaac M Woo
(74) *Attorney, Agent, or Firm* — Garlick & Markison; Bruce E. Stuckman

(57) ABSTRACT

A client device includes at least one processor and a memory that stores application data for a plurality of applications. The memory further stores executable instructions that, when executed by the client device, cause the client device to determine to perform a deletion evaluation function. A set of deletion candidate data is extracted from the application data of at least one of the plurality of applications in response to determining to perform the deletion evaluation function. A subset of the set of deletion candidate data for deletion is generated by selecting ones of the set of deletion candidate data that compare favorably to deletion criteria data. Deletion of the subset of the set of deletion candidate data from the memory is facilitated.

20 Claims, 12 Drawing Sheets

FIG. 4A

Select criteria for files to be identified for deletion:

Which applications/types of files should be searched?
- [X] Photos
- [ ] Contacts
- [X] Text Messages Time since last access for files to be deleted:
At least [28] days Should applications with cancelled subscriptions be uninstalled?
- [ ] Yes
- [X] No Should duplicate files be deleted?
- [ ] Yes
- [X] No How often should files be searched for deletion?
Every [7] days Should applications providing duplicate services be deleted?
- [ ] Yes, delete all but the most frequently accessed application of the same type
- [X] No Should archived files automatically be deleted?
- [ ] Yes
- [X] No

GUI 145

Deletion Criteria Prompt 242

FIG. 4B

GUI
145

Select criteria for photos to be identified for deletion:

Should duplicate photos be deleted?
☐ Yes
☒ No

Should photos posted to social media be deleted?
☐ Yes
☒ No

Should screenshots be deleted?
☐ Yes
☒ No

Should front-facing camera photos be deleted?
☐ Yes
☒ No

Deletion Criteria Prompt
242

FIG. 4C

GUI 145

Select criteria for types of photos that should automatically be kept:

- [ ] Photos that include any face
- [x] Photos that include my face
- [x] Photos that include my friend's face
  Select friend(s) from
  contacts: Elizabeth, Dad
- [x] Photos that were taken on vacation
  Select distance from
  home: 60 miles
  Enter vacation cities:
  Boston, Krakow
- [x] Photos that were sent from
  Select contacts: Elizabeth,
  Kelly
- [x] Photos that I downloaded from
  Select application: Email,
  Facebook, Instagram
- [ ] Photos that I added to an album
- [x] Photos of my pet
  *click to upload photo*
- [x] Photos that includes text that is related to:
  - [x] recipes
  - [ ] passcodes
  - [x] confirmation numbers
  - [x] reservation details
  - [ ] membership numbers
  - [x] business cards
  - [ ] event tickets
  - [x] messaging application history
- [x] Photos of famous buildings, statues, natural features, or landmarks
- [x] Photos of sunsets
- [ ] Photos that are similar to my uploads to select application: Instagram
- [x] Photos generated by another application select application: Instagram
- [x] Photos taken at an event I attended select application: Facebook, Eventbrite
- [x] Screenshots of the following applications: Pinterest, Safari Deletion Criteria Prompt 242

FIG. 4D

GUI 145

Select criteria for types of photos that should be identified for deletion:

- ☐ Photos that do not include any face
- ☒ Photos that do not include at least 80% of faces that are smiling
- ☒ Photos that include at least one person with their eyes closed
- ☒ Photos that include at least 50% of people in the photo that are jumping, and also include at least one person that is not jumping
- ☒ Photos that are blurry
- ☒ Screenshots
- ☐ Photos not taken by this phone's camera
- ☒ Photos with an average pixel value that is darker than (10, 10, 10)
- ☒ Photos with an average pixel value that is brighter than (240, 240, 240)
- ☒ Photos that are too washed out or too dark to identify the object of the photo
- ☒ Photos that do not include any faces of any of my friends
  select application: <u>contacts, Facebook</u>
- ☒ Photos that include the face of: select people from contacts: <u>Rudy</u>
  <u>*click to upload photo of person*</u>
- ☐ Photos of people I have deleted from contacts
- ☒ Photos of social media contacts I have unfriended or unfollowed:
  select application: <u>Facebook</u>
- ☒ Photos that crop out or obscure at least 30% of at least one person's face
- ☒ Photos with a horizon line that is crooked by at least 15 degrees
- ☒ Photos that include these things I don't like
  <u>*click to upload photo*</u>

Deletion Criteria Prompt 242

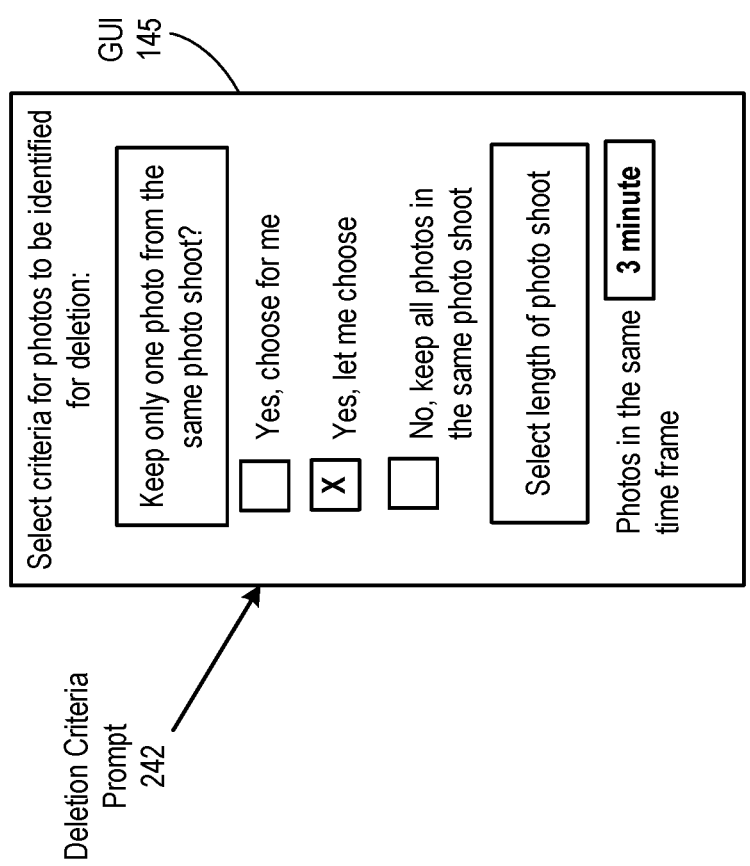

SELECTING APPLICATION DATA FOR DELETION FROM MEMORY OF A CLIENT DEVICE

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and data storage.

BRIEF DESCRIPTION OF THE SEVERAL VIEWS OF THE DRAWING(S)

FIGS. 4A-4F are example illustrations of graphical user interfaces displaying deletion criteria prompts in accordance with the present invention.

DETAILED DESCRIPTION OF THE INVENTION

Figure 1:
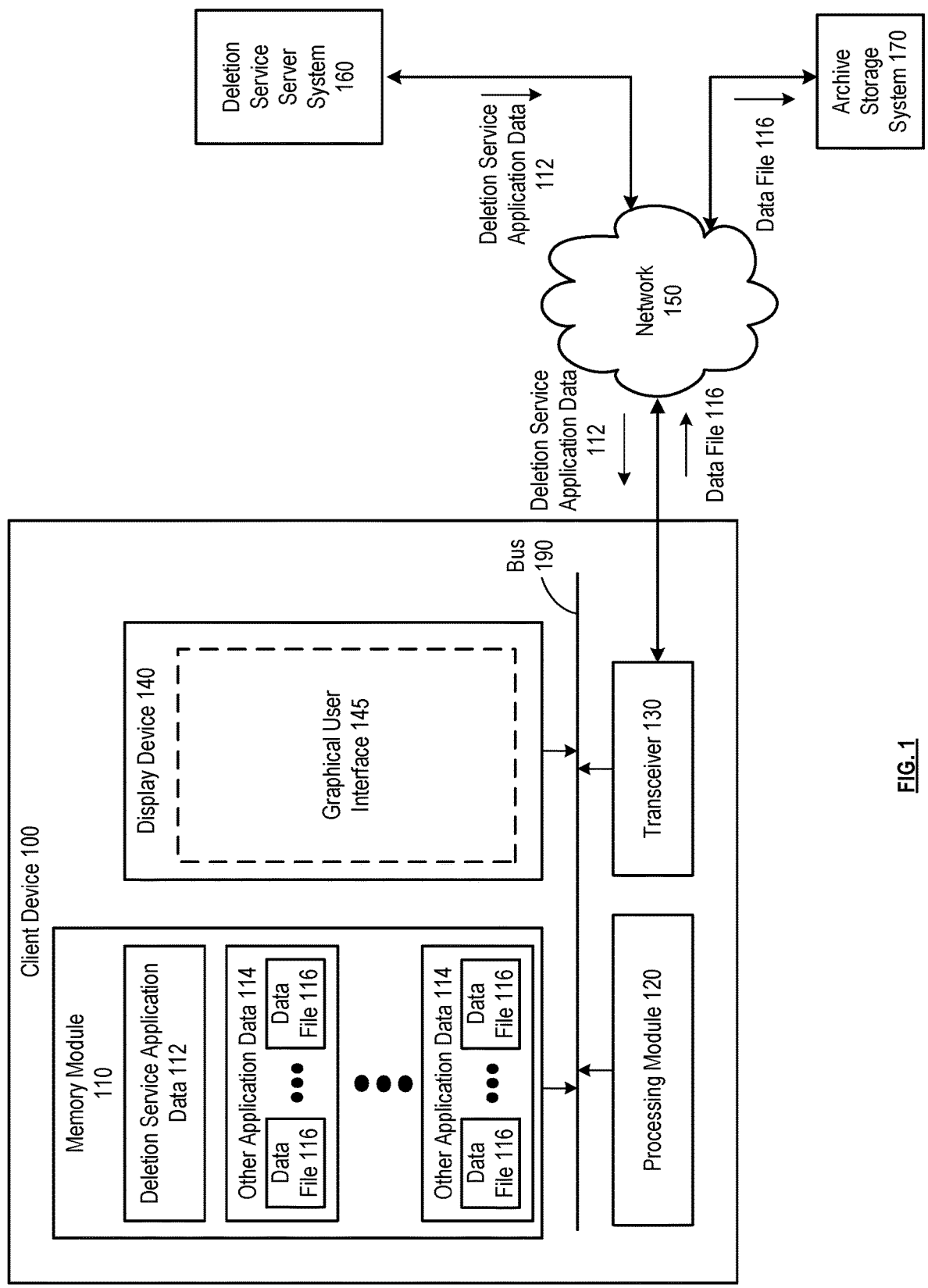
FIG. 1 is a schematic block diagram of an embodiment of a client device in accordance with the present invention.

FIG. 1 illustrates an example embodiment of a client device 100 in accordance with the present invention. The client device 100 can include a memory module 110 that utilizes one or more memory devices, a processing module 120 that utilizes one or more processors, a transceiver 130, and a display device 140, connected via bus 190. Client device 100 can be implemented by utilizing a desktop computing device, a laptop, a tablet, a Personal Computer (PC), a mobile computing device, a cellular device, a wearable device, or other computing device. The transceiver 130 can be operable to communicate bidirectionally via a network 150, which can include a cellular network, the Internet, a wide area network, a local area network, a satellite network, and/or other wired and/or wireless network. The display device 140 can be operable to display at least one graphical user interface (GUI) 145 to a user of the client device 100. The user can interact with graphical user interface 145 by utilizing a touchscreen of the display device 140 and/or by utilizing another user input device of a keyboard, a mouse, a microphone, or other component of client device 100 operable to collect user input.

The client device 100 can be operable to execute a plurality of software applications by utilizing the processing module 120. Corresponding application data 114 for each of the plurality of software applications can be stored in memory module 110 of the client device. Application data 114 for some or all of the plurality of applications can be received via network 150, where the application data 114 includes installation instructions that, when executed by the processing module 120, causes the client device to install the application data 114. Application data 114 for some or all of the applications can be installed in conjunction with installation of firmware or an operating system of the client device 100. Alternatively, application data 114 for some or all applications can be installed in isolation, for example, in response to a user selection via a GUI 145 displayed in conjunction with application data 114 for an application marketplace that enables the user to select applications to be retrieved via network 150.

The application data 114 for each of the plurality of software applications can include executable instructions that, when executed by the processing module 120, cause the corresponding one of the plurality of software applications to run, or otherwise be executed. The user can select one of the plurality of applications to run by interacting with a GUI 145 of a home screen or other menu that prompts the user to select from the plurality of software applications. In some embodiments, the running of a particular software application causes the display device 140 to display a GUI 145 of the particular software application while the particular software application is running. Executable instructions for one or more of the plurality of software application can be executed automatically, for example, in response to detection of an interrupt event that causes the corresponding operational instructions to be run. In such embodiments, routines of some or all applications can be running while a GUI 145 for a different application is displayed to the user. Some or all of the software applications can be stored in isolation and can run in isolation, for example, where application data 114 is containerized and/or sandboxed.

In addition to the executable instructions, some or all of the application data 114 can further include various data files 116 that are stored locally via memory module 110 in conjunction with the application. These data files can be generated by the client device 100 as a result of execution of the application data for the same or different application, and/or can be downloaded by the client device 100 via network 150 as a result of execution of the application data for the same or different application. The data files 116 can include video files, audio files, image files, and/or other media files. The data files 116 can include text files, document files, or other files that include textual data generated via user input by the user of client device 100 and/or generated via user input to a different client device communicating with client device 100 via the network. The data files 116 can include application history files corresponding to previous use of the application by the user. In particular, the data files 116 can be separate from the executable instructions of the application data, where the software application can continue to be run properly by the client device 100 if these data files 116 are deleted and/or otherwise removed or altered in memory module 110.

Continued generation and storage of data files 116 by client device 100 overtime can cause the memory module 110 of client device 100 to approach and/or reach its memory capacity. In particular, large data files such as videos and/or photographs generated by a camera of the client device 100 and/or downloaded by client device 100 via network 150 can take up a valuable fraction of memory capacity of client device 100. In many cases, data files 116 will remain in storage in conjunction with a corresponding application until a user runs the application and interacts with the GUI 145 to manually select data files 116 for deletion from the application. Manually inspecting and selecting data files 116 for deletion can be timely, as this can require running each of a plurality of independent applications one at a time, and, for each particular application, determining whether each of the plurality of data files 116 stored in conjunction with the particular application should be deleted. This can require interacting with GUI 145 to view and/or otherwise inspect each of the plurality of data files 116 of each particular application, for example, one at a time. In some cases, a user may not realize which applications are storing unnecessary data files, as these data files may have been long forgotten by the user and/or are otherwise not accessed by the user frequently or at all. In these cases, the user may not facilitate deletion of these forgotten data files, and these data files will thus remain in storage and continue to utilize space of memory module 110. In other cases, the tedious nature of manually selecting particular files for deletion may be too daunting for the user, and the user may instead elect to delete large quantities of data files 116 all at once without inspecting the files first, which can result in accidental deletion of files the user wishes to access at a later time.

To mitigate this problem, a deletion service application can be executed by client device 100 to automatically select data files 116 that are determined to be unnecessary for further storage on client device 100, and to automatically facilitate deletion of these data files 116 from storage on client device 100. The memory module 110 can store deletion service application data 112 that includes executable instructions that, when executed by the processing module 120, cause the deletion service application to be executed. Execution of deletion service application data 112 for the deletion service application can include display a GUI 145 of the deletion service application data 112, for example, to prompt the user to enter various deletion criteria, via user input to GUI 145, which is utilized by the deletion service application to determine which types files of other application data 114 of other software application will be identified for deletion. GUI 145 of the deletion service application data 112 can further prompt the user to inspect data files 116 that were identified for deletion based on the deletion criteria, allowing the user to confirm deletion or deny deletion, via user input to GUI 145, of each identified data file. Facilitating deletion of data files 116 confirmed for deletion can include removing the data files 116 from application data of the corresponding application and/or can include otherwise allocating the portions of memory module 110 utilized to store the corresponding data files 116 for storage of different data.

Facilitating deletion of data files 116 can further include transferring the selected data files 116 to an archive storage system 170 via network 150 by utilizing transceiver 130, as illustrated in FIG. 1. Alternatively, a different communication interface of client device 100 that facilitates a wired and/or wireless connection with the archive storage system 170 can be utilized to transfer the data files. The archive storage system 170 can include at least one memory and can be implemented by utilizing a memory card, external hard drive, external memory device, a server system utilized by the user for archive storage of data files of the user, and/or other external memory that is not included within client device 100. In some embodiments, the archive storage system 170 corresponds to a server system associated with one of the plurality of software applications, where the one of the plurality of software application corresponds to the particular application data 114 from which a data file 116 is being deleted from. In such embodiments, some or all the application data 114 of the software application may have been generated by and/or received from this server system.

The deletion service application data 112 can be received by the transceiver 130 from a deletion service server system 160 via network 150 as illustrated in FIG. 1. For example, the deletion service server system can include at least one processor and memory of a computing system associated with an entity that generated and/or provides the deletion service application data 112 for download by a plurality of client devices 100. Alternatively, the deletion service application data 112 can be integrated within and/or can otherwise be downloaded in conjunction with firmware and/or an operating system of the client device 100. For example, the deletion service application data 112 can be generated and/or provided by an entity that manufactured the client device 100 and/or by an entity that generated an operating system that runs on the client device 100.

Figure 2A:
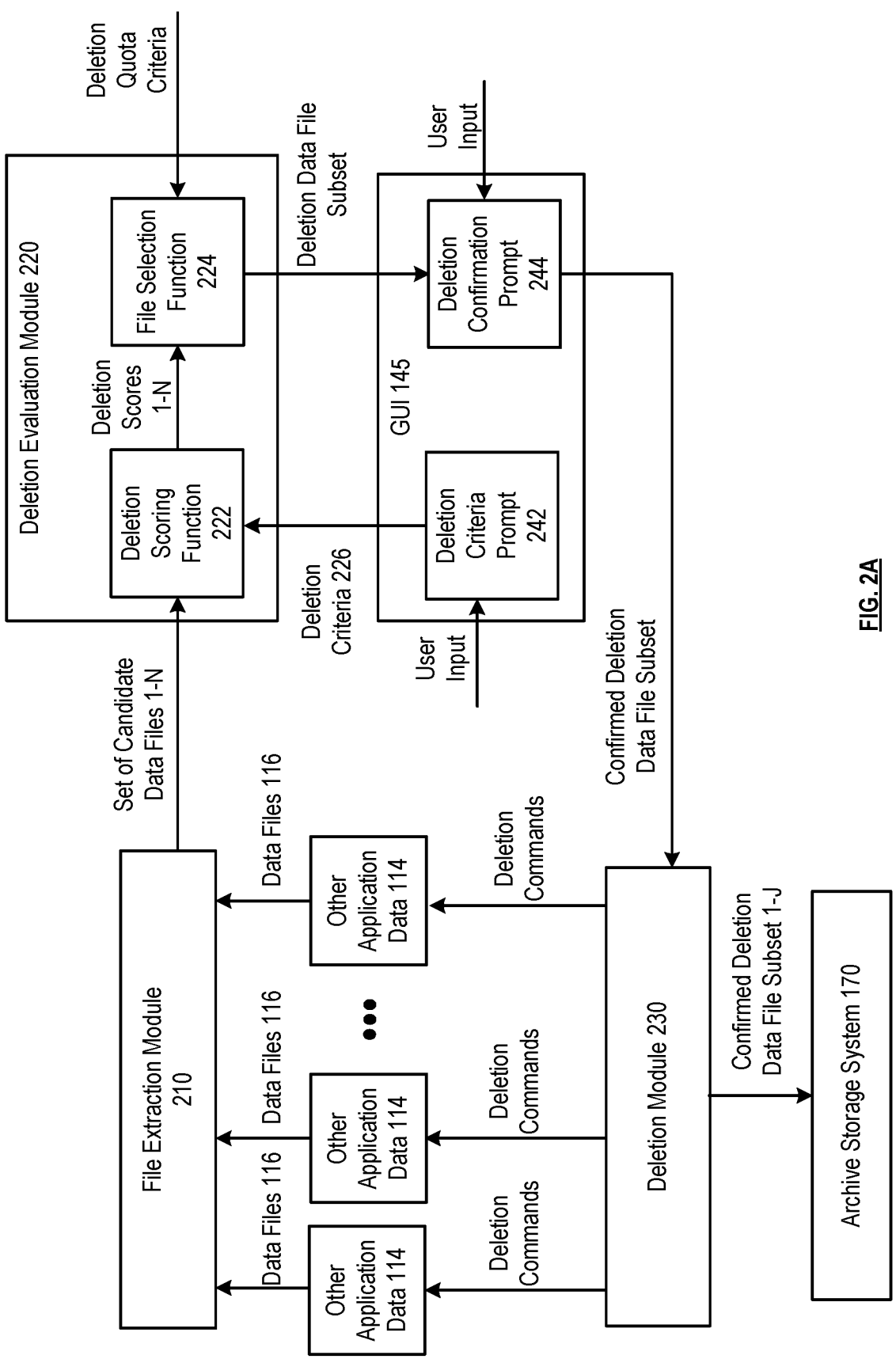
FIG. 2A is a schematic block diagram of a plurality of modules of a client device utilized to select application for deletion in accordance with the present invention.

FIG. 2A illustrates an embodiment of a deletion process performed by the deletion service application when executed by the processing module 120. In particular, the deletion service application data 112 can include a file extraction module 210, a deletion evaluation module 220, and/or a deletion module 230. The file extraction module 210, deletion evaluation module 220, and/or deletion module 230 can be implemented via corresponding executable instructions of the deletion service application data 112 that, when executed by the processing module 120, cause the client device 100 to perform the functionality of the file extraction module 210, a deletion evaluation module 220, and/or a deletion module 230, respectively, as discussed herein.

The file extraction module 210 can be operable to extract some or all of the data files 116 stored for some or all of the other applications in corresponding other application data 114 of memory module 110. The extraction can include generating a full and/or compressed copy of each of the candidate data files 1-N for processing by the deletion service application. In such embodiments, each of the candidate data files 1-N generated by the file extraction module 210 and processed by the deletion evaluation module 220 corresponds to a full and/or compressed copy of some or all of a corresponding original data file 116 that is a candidate for deletion from memory module 110. In particular, as memory capacity may already be constrained, the extraction can include inspecting and/or copying metadata of each data file 116 stored within application data of another application, or inspecting only a portion of each data file 116.

In some embodiments, the file extraction module can determine, based on deletion criteria such as deletion criteria 226, whether the entirety of a data file needs to be extracted based on inspection of metadata of the data file itself and/or other metadata of the corresponding application data 114 that indicates information relating to storage and/or access its data files 116. For example, the deletion criteria may include a required age of deletion candidate data files, a required infrequency of access of deletion candidate data files, a required timeframe since last access of deletion candidate data files, a required file type of deletion candidate data files, or other requirements that can be extracted from metadata without inspecting the data file itself. The file extraction module can first inspect and/or copy this metadata for comparison to the deletion criteria. If the metadata of a data file, such as a data of creation of the data file, a number of times the data file has been accessed, an amount of time since the last access of the data file, and/or a type of the data file compares unfavorably to the corresponding deletion criteria, the file extraction module can determine to skip this data file, where this data file is not copied and/or is otherwise not included in the set of candidate data files 1-N. If the metadata of the data file compares favorably to the corresponding deletion criteria, a full or compressed copy of the metadata and/or content of the data file can be generated in response for processing by the deletion evaluation module 220. Alternatively, this evaluation of the metadata alone is sufficient in determining that the data file be deleted, and if the metadata of the data file compares favorably to the corresponding deletion criteria, deletion of the data file is either facilitated automatically, or is facilitated once user confirmation is received via GUI 145 via user input in response to deletion confirmation prompt 244.

In some embodiments, copies corresponding to each of the set of candidate data files 1-N are created and deleted one at a time. In particular, a copy of an individual data file 116 of the set of candidate data files 1-N can generated, and the copy can be processed by deletion evaluation module 220. The copy is deleted once processing by deletion evaluation module is complete, and another copy corresponding to another one of the set of candidate data files 1-N is then created for processing by deletion evaluation module 220. In some embodiments, a selected subset of the set of candidate data files 1-N are copied and evaluated in tandem, and once the tandem evaluation of the selected subset of the set of candidate data files 1-N is complete, the copies of the subset are deleted and a new selected subset of data files 116 are copied for their own respective processing. For example, these selected subsets that are each evaluated in tandem, one at a time, can correspond to sets of similar data files, as discussed in further detail in conjunction with FIG. 2B.

The file extraction module 210 can extract data files 116 from the other application data 114 in response to determining user permission for the deletion service application to access some or all of the other applications has been granted. In particular, the GUI 145 can present a prompt for the user to select which ones of the plurality of the other applications the deletion service application has access to, where the file extraction module 210 only accesses data files 116 that are stored application data for the selected applications.

In some embodiments, the file extraction module 210 can extract metadata or data files from application data even if they are not to be deleted. This can include access history data of various software applications, user account data associated with various software applications, and/or other pertinent information that may be useful in evaluating whether various data files should be deleted. This can include data files in application data of a first software application with content that, when analyzed, may indicate that other types of data files stored in application data of the same or different software application should be preserved or deleted. This data can similarly be extracted from application data of the corresponding software application and can be utilized by the deletion evaluation module 220 in determining which of the set of candidate data files 1-N should be deleted. Alternatively, some or all of this information can be obtained by querying a server system corresponding to one or more of the software applications, via network 150, for information corresponding to the user's account and/or usage history of the software application, and/or by receiving this information from one or more server systems via network 150 in response.

Once the set of candidate data files 1-N have been extracted, the set of candidate data files 1-N can be evaluated for deletion. The deletion evaluation module 220 can perform a deletion scoring function 222 on each of the set of candidate data files 1-N. The deletion scoring function can utilize deletion criteria 226, which can be generated based on user input to GUI 145 in response to a deletion criteria prompt 242 displayed by GUI 145. The deletion scoring function can generate a deletion score for each of the candidate data files, where data files determined to compare more favorably to the deletion criteria are assigned more favorable deletion scores than data files determined to compare less favorably to the deletion criteria.

A file selection function 224 can be utilized to determine whether a file is selected for deletion, based on the corresponding deletion score. In some embodiments, the deletion score is a binary value indicating the file should be deleted when the data file compares favorably to the deletion criteria, and indicating the file should not be deleted when the data file compares unfavorably to the deletion criteria. In other embodiments, the deletion score is a discrete or continuous value that is compared to a deletion score threshold, where the file is selected for deletion if the deletion score compares favorably to a deletion score threshold, and where the file is not selected for deletion if the deletion score compares unfavorably to a deletion score threshold.

In some embodiments, performing the file selection function 224 includes ranking some or all of the set of candidate data files 1-N by their respective deletion score, where ones of the set of candidate data files 1-N with more favorable deletion scores are ranked higher than ones of the set of candidate data files 1-N with less favorable deletion scores. The ones of the ranked set of candidate data files 1-N that are selected can be based on deletion quota criteria, which can be determined based on current memory capacity or current storage information for memory module 1101 based on user configurations determined based on user input to GUI 145 in response to a prompt to select deletion quota criteria; and/or can otherwise indicate a number of files or amount of data to be deleted. Performing the file selection function 224 can further include selecting a predetermined number of highest ranked ones of the set of candidate data files 1-N for deletion. Performing the file selection function 224 can alternatively include selecting highest ranked ones of the set of candidate data files 1-N for deletion that are necessary to meet or exceed a predetermined total file size for deletion. The total file size for deletion can be based on a maximum memory capacity and/or a desired amount of available memory capacity, and can be further based on the current memory capacity, where the total file size for deletion is a difference between the current memory capacity and the maximum memory capacity and/or the desired amount of available memory capacity. In some embodiments, the deletion score is further based on the size of the data file where larger data files are assigned more highly ranked deletion scores, enabling a smaller number of files to be deleted to meet the deletion quota criteria.

The deletion criteria can be predetermined and/or can be configured via user input to GUI 145. The deletion criteria can include a plurality of automatic preservation factors. If any of these automatic preservation factors are met, the data file can automatically be not selected for deletion regardless of whether other factors are met. In some embodiments, at least a threshold number of conditions and/or all of a set of conditions must be determined to be met for the automatic preservation factor to be met.

The deletion criteria can include a plurality of automatic deletion factors. If any of these automatic deletion factors are met, the data file can automatically be selected for deletion regardless of whether other factors are met. In some embodiments, at least a threshold number of conditions and/or all of a set of conditions must be determined to be met for the automatic deletion factor to be met. If automatic preservation factors and automatic deletion factors exist, each of these factors can be ranked via user configuration or a predetermination to determine which factors take precedent.

Alternatively or in addition to automatic deletion factors, the deletion criteria can include a plurality of deletion weighting factors 1-$k$. A value can be computed for each of the plurality of deletion weighting factors for each data file. Each of the plurality of deletion weighting factors, if met, can cause the deletion score to be more favorable. The deletion score can be generated by computing a sum or weighted sum of the values computed for each deletion weighting factor 1-$k$. For example, a deletion score s for a data file can be computer as the sum, over all of the deletion weighting factors 1-$k$, of the product of the value $v_i$ computed for the ith deletion weighing factor and its corresponding weight $w_i$, where $v_i$ and $w_i$ are positive values and where higher values of s correspond to more favorable deletion scores that are more likely to result in deletion of the corresponding data file:

$$s = \sum_{i=1}^{k} w_i v_i$$

Deletion weighting factors can include factors such as a storage size factor, an access history factor, an originating source factor, and an application type factor. Determining the storage size factor is met can include determining the size of the data file exceeds a storage size threshold indicated in the deletion criteria. Determining the access history factor is met can include determining the number of accesses is less than an access number threshold indicated in the deletion criteria; can include determining frequency of accesses is less than an access frequency threshold indicated in the deletion criteria; and/or can include determining an amount of time since the data file was last accessed exceeds an access recency threshold indicated in the deletion criteria. Determining the originating source factor is met can include determining the originating source of the file matches or otherwise compares favorably to one of a set of particular originating sources indicated in the deletion criteria. Determining the application type factor is met can include determining the software application in which the data file is stored matches or otherwise compares favorably to one of a set of particular software application and/or one of a set of software application types indicated in the deletion criteria. In this example, the values for the deletion weighting factors can correspond to binary values indicating whether or not the deletion weighting factor was met, and the deletion score can correspond to a number of the deletion weighting factors that are met and/or a weighted sum of the deletion weighing factors that are met.

Alternatively, the values for some or all of the plurality of deletion weighting factors can correspond to a discrete or continuous value calculated by the deletion scoring function, where a more favorable value is assigned if the particular deletion weighting factor indicates the data file is more favorable for deletion. For example, rather than comparing the storage size to a storage threshold, the deletion weighting factor corresponding to storage size can be proportional to and/or an increasing function of the size of the data file. Similarly, the deletion weighting factor corresponding to access can be a function of number of accesses, frequency of access, and/or time since last access. Deletion weighting factors can utilize any other factors as discussed herein, such as factors based on content of a data file itself and/or other user configurable factors relating to the data files stored on client device 100, and the corresponding values can be discrete, continuous, and/or binary values calculated based on these other factors.

The weighted sum can be applied to the binary, discrete, and/or continuous values computed for each deletion weighing factor. The weights can be assigned to each deletion weighting factor based on its relative importance in dictating deletion. This can be predetermined and/or configured by the user, for example, where the user selects weights for each deletion weighting factor via GUI 145. The user can similarly rank the plurality of deletion weighting factors based on their relative importance via GUI 145, and the weights can be determined based on the ranking of the deletion weighting factors, where more favorable weights are assigned to higher ranked deletion weighting factors.

Alternatively or in addition to automatic preservation factors, the deletion criteria can include a plurality of preservation weighting factors 1-$j$. A binary, discrete, and/or continuous value can be computed for each of the plurality of preservation weighting factors for each data file. Each of the plurality of preservation weighting factors, if met, can cause the deletion score to be less favorable. Alternatively, higher or otherwise more favorable discrete or continuous values computed for each preservation weighting factor can cause the deletion score to be less favorable. Preservation weighting factors can similarly include, for example, originating source factors, and/or application type factors, where a data file matching or comparing favorably to a selected originating source and/or application type, indicated in the deletion criteria, for which data files should be preserved can cause a data file to have a lower deletion score.

The deletion score can be generated by computing a sum or weighted sum of the values computed for each preservation weighting factor. This can be computed in conjunction with the deletion weighting factors, where the sum and/or weighted sums of values computed for the preservation weighting factors 1-$j$ detracts from the deletion score. The weighted sum over all of the preservation weighting factors 1-$j$ can be computed of the product of the value $p_i$ computed for the ith preservation weighing factor and its corresponding weight $y_i$. The values $p_i$ and $y_i$ can similarly be positive values, where higher values of s correspond to deletion scores that are more likely to result in deletion of the data file.

$$s = \left(\sum_{i=1}^{k} w_i v_i\right) - \left(\sum_{i=1}^{j} y_i p_i\right)$$

The weights assigned to each deletion weighting factor and preservation weighting factor, respectively, can dictate the relative importance of each preservation weighting factor and each deletion weighting factor. Alternatively, the relative importance of the preservation weighting factors and deletion weighing factors can further be dictated by a deletion factor q, which can also be user configurable and indicated in the deletion criteria.

$$s = q\left(\sum_{i=1}^{k} w_i v_i\right) - (1-q)\left(\sum_{i=1}^{j} y_i p_i\right)$$

Once the file selection function 224 has been performed on the set of candidate data files 1-N, the subset of the set of candidate files that are identified for deletion by the file selection function can be deleted from memory automatically and/or can be transferred to an archive storage system 170 automatically via deletion module 230. Alternatively, some or all of this deletion data file subset identified for deletion can be presented to the user via GUI 145, allowing the user to make the final decision as to whether or not these files are deleted. A deletion confirmation prompt 244 can be presented to the user, prompting the user to select which ones of the deletion data file subset should be deleted and/or archived. Metadata, file name, file descriptors, and/or compressed or full content of the file can be displayed to the user to aid the user in making their decision. This can include a copy of the file generated by the file extraction module 210 and/or portions of the data file extracted by the file extraction module 210. Alternatively, the original file stored in memory module 110 can accessed for display to the user and/or inspection by the user.

Once a subset of the deletion data file subset are confirmed for deletion via user input, the data files corresponding to this confirmed deletion data file subset can be deleted from memory module 110. File identifiers and/or memory locations corresponding to the confirmed deletion data file subset can be utilized by a deletion module 230 to facilitate deletion of the corresponding data files from memory module 110. This can include sending deletion commands to memory module 110 with the corresponding file identifiers and/or memory locations. Alternatively, deletion can be facilitated through the running of the corresponding software application, where the software application facilitates its own deletion of its data files. In these embodiments, the deletion module 230 can facilitate automatically running each of the plurality of software applications via processing module 120 and automatically sending deletion commands via the software application to delete the corresponding data files from the application data of the software application. Alternatively, as such permissions may be prohibited, the deletion module 230 can facilitate running of the corresponding software application, for example, causing the software application to automatically present its deletion menu via a GUI 145 of the software application and/or to automatically present one of its data files of the confirmed deletion data file subset via its deletion menu. The user can interact with the GUI of the corresponding software application to facilitate deletion of the data files accordingly.

The deletion module 230 can further be operable to transfer some or all of the data files of the confirmed deletion data file subset to an archive storage system 170 via transceiver 130 or a different communication interface. In some embodiments, the GUI 145 can prompt the user to connect a hard drive, memory card, or other external memory to the client device 100 via a wired and/or wireless connection. The transfer of the files can be facilitated once the connection to the external memory is established, and the files can be deleted once they are determined to be saved on the external memory. In some embodiments, the deletion module 230 can automatically run a software application that stores a data file in the confirmed deletion data file subset and instruct the software application to transfer the data file to storage on a server system associated with the software application, for example, in storage linked to a user account associated with the user of the software application for access by the user via the same or different client device 100 via network 150.

Figure 2B:
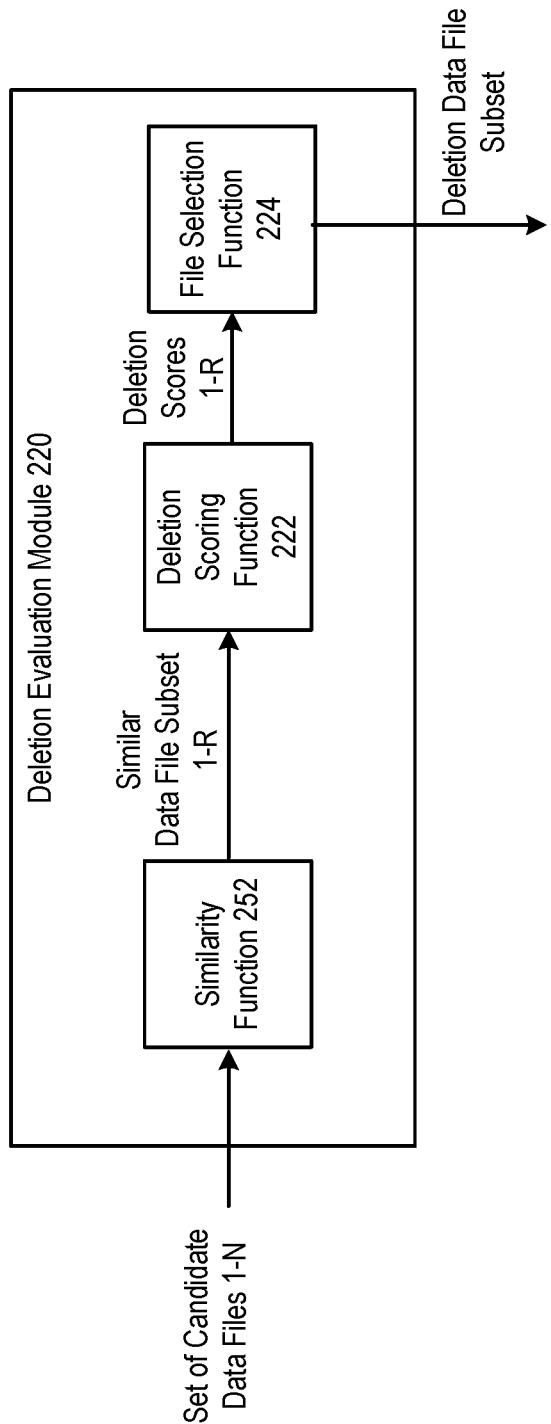
FIG. 2B is a schematic block diagram of a deletion evaluation module of a client device in accordance with the present invention.

FIG. 2B illustrates an embodiment of deletion evaluation module 220 that is further operable to perform a similarity function 252. In particular, the deletion service application can identify duplicate and/or otherwise similar data files that are redundant and/or otherwise do not all need to be stored on the client device 100. The similarity function can be performed on the pairs of and/or subsets of the set of candidate data files to identify one or more groupings of similar and/or duplicate data files. This can include comparing content of pairs of data files, comparing file creation time and/or file creation source of pairs of data files, comparing types of pairs of data files, performing a clustering function on the set of candidate data files, and/or otherwise performing a function on pairs or other proper subsets of the set of candidate data files to generate a similarity score between pairs of data files and/or to otherwise generate groupings of data files. The similarity score of a pair of data files can be compared to a similarity threshold, and the pair can be determined to be similar if the similarity score is within or otherwise compares favorably to a similarity threshold. Alternatively, a similarity score between each data file in a subset and a mean data file value calculated for the data files in the subset can be compared to the similarity threshold, where the subset of data files is considered a similar subset if the similarity score between every data file in the subset and the mean data file value compares favorably to the similarity threshold. In some embodiments, the similarity threshold requires an exact match, where only duplicate sets of files are identified. Alternatively, the similarity threshold can be looser to allow data files that are not identical, but still similar enough to be considered redundant, to be identified. For example, image files that are determined to be different filtered and/or edited versions of the same original image, and/or image files that are determined to have been all captured in a same rapid burst of images, and/or a same photo shoot of images of people in a similar pose and/or of objects and/or scenery in a similar orientation can be identified as substantially similar or otherwise redundant, even though they are not exactly identical.

The deletion scoring function 222 can be performed on data files within each identified subset of similar data files, such as a similar data file subset 1-R. A deletion score can be generated in the same or different fashion as described in conjunction with FIG. 2A for each data file in a similar data file subset 1-R. For example, data files of a higher quality, data files that have been accessed more frequently, data files that take up a smaller amount of memory, and/or data files with other desirable qualities indicated in the deletion criteria, relative to the other data files in the similar data file subset 1-R, can be assigned lower deletion scores than the other data files in the similar data file subset 1-R. The file selection function 224 can be performed on the similar data file subset 1-R by utilizing the corresponding deletion scores 1-R to rank the similar data file subset 1-R and/or to determine the data file in the subset with the lowest deletion score. The data files in the subset with the lowest deletion score can be identified to be kept, and the remaining data files in the subset can be identified for deletion in the deletion data file subset.

The user can similarly be presented with the files in the deletion data file subset via deletion confirmation prompt 244 as discussed in FIG. 2A. The user can similarly confirm that some or all of these similar files be deleted. In some embodiments, the user can be presented with all of the files in the similar data file subset 1-R, including the data file with the lowest deletion score. The user can select which one or more of the similar data files be kept, and the remaining data files in the similar subset can be deleted. The similar data file subset 1-R can be presented to the user in accordance with the ordering dictated by the ranking of the deletion scores 1-R, for example, where the deletion confirmation prompt 244 indicates a recommendation that the data file in the similar data file subset 1-R with the lowest deletion score be preserved and that the rest of the data files be deleted. In some embodiments, once the similar data file subset 1-R is identified by performance of the similarity function 252, all of the similar data file subset 1-R is automatically presented to the user without performing the deletion scoring function, and the user can elect which of the similar data files are preserved without being provided such a recommendation.

In some embodiments, the similar data file subset 1-R is only presented to the user if the corresponding similarity score for the similar data file subset 1-R is less similar than and/or otherwise compares unfavorably to a second similarity threshold, for example, that is stricter than the first similarity threshold utilized to identify the similar data file subset 1-R. In particular, all but one of a set of duplicate data files and/or extremely similar files can automatically be deleted without user confirmation. A set of similar data file subset 1-R that are similar enough to be considered redundant, but not similar enough to dictate deletion without user review, can be presented to the user via deletion confirmation prompt 244. The user can configure the similarity function, the first similarity threshold, and/or other criteria utilized to identify data files as similar to generate similar data file subsets. The user can configure the second similarity threshold and/or other criteria utilized to determine whether or not similar data file subset 1-R need be reviewed and/or can be deleted automatically.

Figure 3A:
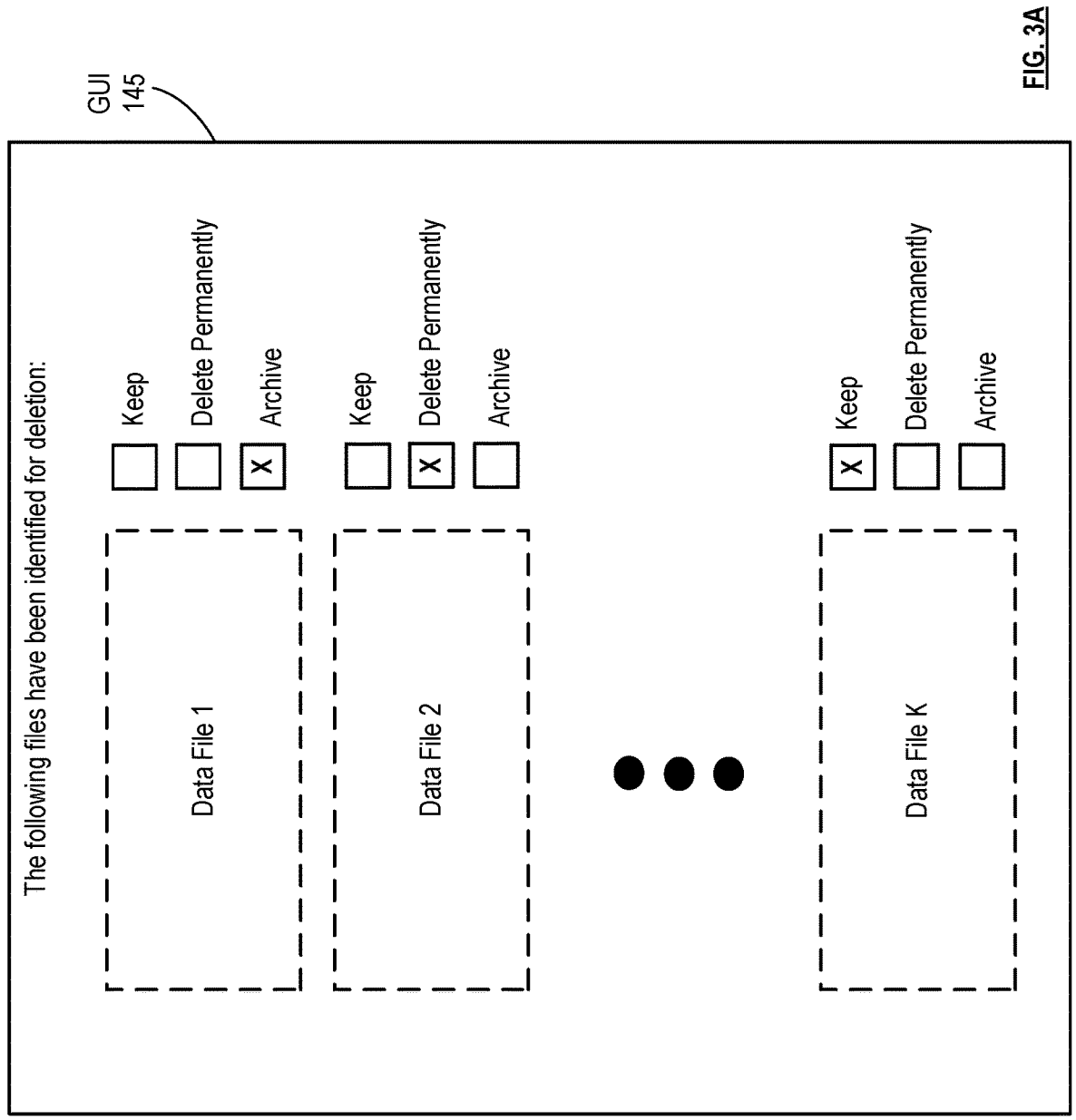
FIGS. 3A-3B are example illustrations of graphical user interfaces displaying deletion confirmation prompts in accordance with the present invention.

FIG. 3A presents an example embodiment of GUI 145 displaying deletion confirmation prompt 244. Each data file can be displayed and the user can elect whether to keep the data file, delete the data file permanently, and/or transfer the data file to an archive storage system 170. The data files can be presented in an ordering in accordance with the ranking of their respective deletion scores, where data files with most favorable deletion scores and/or with data files that met an automatic deletion criteria are presented first and/or at the top. The data files can be presented one at a time via GUI 145, and/or can be presented in the same display. In some embodiments, the user can scroll through a list of data files 1-K identified for deletion, where the highest ranked data files with most favorable deletion scores are in view, and where the user must scroll to view lower ranked data files with less favorable deletion scores. In some embodiments, the data files are sorted by its application in which it is stored, where the GUI presents ones of the data files stored in the application data for a first particular application first, and then presents other data files stored in application data for another particular application next, once the user has reviewed the data files stored in the first particular application.

The data file can be displayed along with timestamp data; originating source data; information indicating which application the data file is stored in; size of the data file; access frequency to the data file; content of the data file; the deletion score for the data file; indications of which of the automatic deletion factors; deletion weighting factors and/or preservation weighting factors were determined to be met; individual values calculated for some or all deletion weighting factors and/or preservation weighting factors; and/or other reasoning as to why the data file was flagged for deletion. This information can aid the user in determining whether the file should be deleted. The user can configure which of this information is displayed via GUI 145.

If the user elects to preserve one or more of the presented data files for deletion, the deletion service application can automatically identify more data files for deletion in response. This can include selecting other ones of the set of candidate data files for deletion with next highest ranked deletion scores that were not included in the originally identified subset. In particular, if the user chooses to preserve too many files and/or if the files selected for deletion do not meet the deletion quota criteria, a number of additional files that are next highest ranked can be automatically selected and presented to the user via the GUI 145. Alternatively, some or all of the deletion criteria can be automatically loosened to ensure more files are identified as deletion candidates and/or are presented to the user. This can include prompting the user to select deletion criteria to be changed and/or loosened via GUI 145 if not enough files are identified for deletion and/or confirmed for deletion by the user to meet the deletion quota criteria. This process can repeat until the user has selected to delete a sufficient number of files and/or has selected to delete data files with a total amount of data required and/or desired to be deleted as indicated in the deletion quota criteria.

The deletion service application can alternatively and/or additionally identify entire software applications installed on client device 100 that should be uninstalled, where the corresponding application data 114 is deleted from the client device entirely. The deletion criteria can similarly indicate factors utilized to determine whether software applications be uninstalled. The same or different automatic deletion factors, automatic preservation factors, deletion weighting factors, and/or preservation weighting factors can be utilized to generate deletion scores and/or to identify software applications for uninstalling. For example, the deletion criteria can include the access history factors, where software applications that are infrequently run and/or that have not been run recently are assigned higher deletion scores. This evaluation of software applications can be a separate process from evaluating data files for deletion and/or can be performed in conjunction with evaluating data files for deletion, for example, where data files and software applications are assigned deletion scores and are ranked in the same ranking. The ranking assigned to software applications can further be a function of the deletion scores assigned to their data files, for example, where software applications with a high proportion of data files identified for deletion are more likely to be deleted, and where software applications with at least one data file that meets the automatic preservation factors will not be deleted.

Figure 3B:
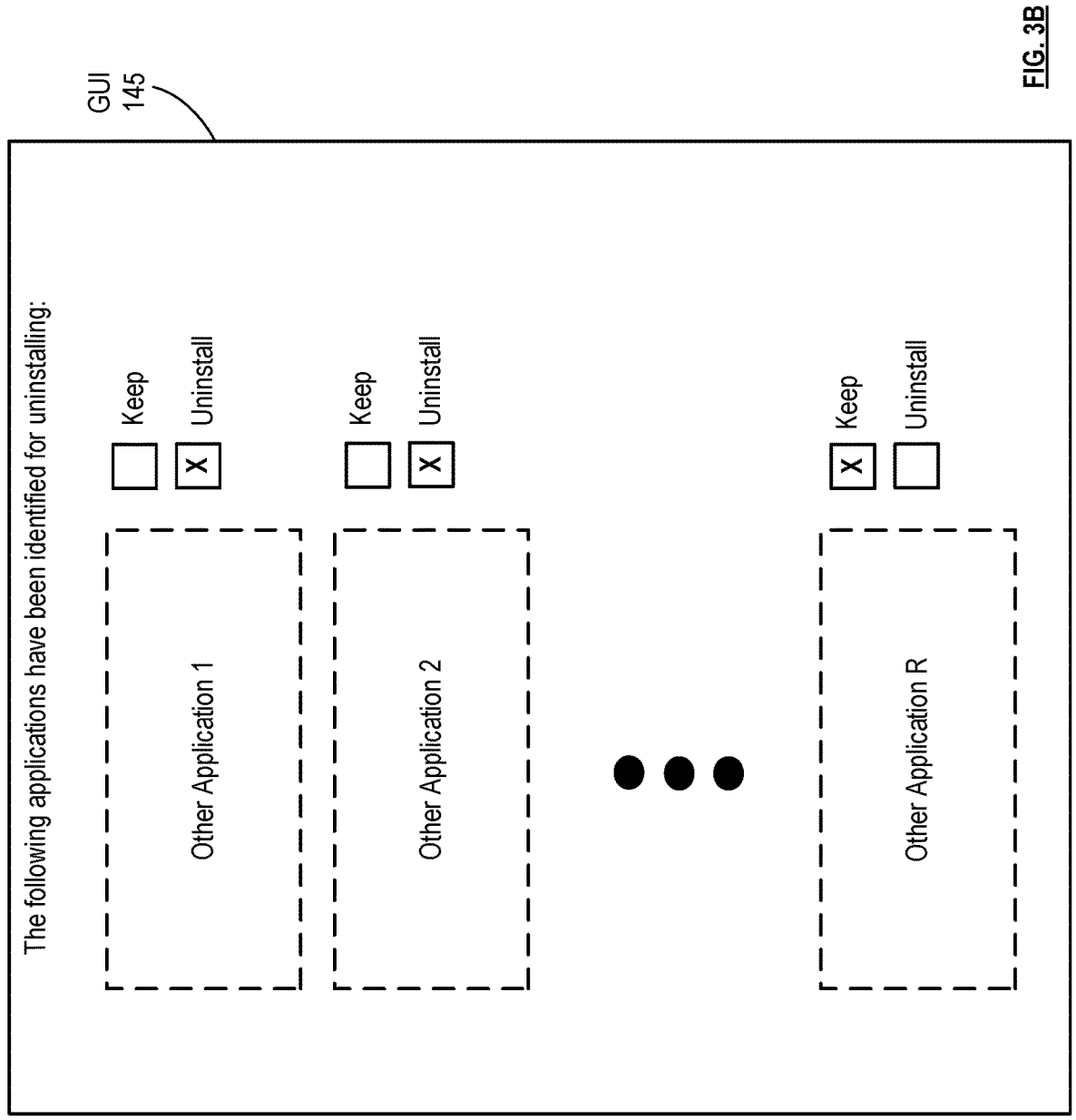

FIG. 3B presents another example embodiment of GUI 145 displaying deletion confirmation prompt 244, where other applications identified for uninstalling are displayed in the same or different fashion as the data files as discussed in conjunction with FIG. 3A. A visual icon, name, or other identifier of these applications can be displayed, and can be presented in an ordering corresponding to the ranking of the deletion scores for the software applications. Information such as access history; data size of the application; type of the software application; whether or not user data and/or some or all data files are backed up on a user account on a server system associated with the software application; examples of data files stored in the application data for the software application that have low deletion scores and/or that meet automatic preservation factors and/or other preservation weighing factors; the deletion score and/or individual values for automatic deletion factors, deletion weighing factors, preservation weighing factors, and/or automatic preservation factors for data files stored by the software application and/or for the software application as a whole; other reasoning as to why the software application was selected for deletion; and/or other information about the software application that could aid the user in determining whether the application be uninstalled can be presented in conjunction with each identified software application via GUI 145. The user can similarly elect whether to keep or uninstall each application. In some embodiments, if an application is determined to be uninstalled, data files can similarly be archived to an archive storage system 170. In such embodiments, the user can select whether all data files be archived and/or can individually indicate which data files be archived.

FIGS. 4A-4F present example embodiments of deletion criteria prompt 242 displayed via GUI 145. Deletion criteria can be based on various user selections and/or entries in response to display of one or more deletion criteria prompts 242.

As illustrated in FIG. 4A, the user can select which types of files should be searched and/or otherwise considered in the set of candidate data files 1-N. The file extraction module 210 can automatically determine to extract and/or copy files that compare favorably to file type selections indicated by the user. These file types can include photos or other image files, audio files, document files, messaging history of a messaging application and/or SMS or MMS text messages received via a cellular service utilized by the client device; contact entries for contacts stored by a contacts application, for example, for utilization by communicating via the cellular service and/or for communicating via another messaging application; custom data types generated and/or stored for particular software applications installed on client device 100; and/or other files types of data files. The user can further provide a ranking and/or weights to different types of files and/or to the different applications from which the files originated to be utilized in generating the deletion score.

In some embodiments, the set of candidate data files 1-N can include a set of duplicate data files extracted from the application data of the same application or extracted from application data of multiple, different applications. As used herein, a set of duplicate data files can correspond to a set of data files such as photographs, videos, images, audio files, document files, text files, and/or other files with content that matches exactly and/or that is substantially identical. The user can select whether or not such duplicate files be deleted. This deletion criteria can be utilized by the deletion evaluation module 220 to automatically delete ones of the set of candidate data files 1-N that are determined to be a duplicate of another one of the set of candidate data files 1-N and/or that are determined to be a duplicate of another data file stored in memory module 110. For example, this can be utilized in performing similarity function 252 to identify similar data file subsets and to select one of the data files in the similar data file subset to be kept in memory, as discussed in conjunction with FIG. 2B. This can include comparing file names, metadata of the file, and/or content of the file itself to determine if two or more files of the set of candidate data files 1-N are duplicated. This can include comparing text of text files, image data of image files and/or video files, audio data of audio files, and/or otherwise comparing content of pairs of files to determine if the content is the same and/or substantially the same. In some embodiments, if a subset of the set of candidate data files 1-N are determined to be duplicates, one of this subset of duplicate files is kept, and the rest of the duplicate files in this subset are deleted. This can occur automatically and/or the user can confirm deletion of the duplicate files. Determining that a data file is a duplicate of another data files stored by client device 100 can correspond to an automatic deletion factor or a deletion weighing factor utilized to generate the deletion score.

The user can select how often files are searched for deletion by the deletion service application by entering and/or selecting a frequency at which the deletion process illustrated in FIG. 2A is performed for data files on the client device 100, or otherwise indicating which times the deletion service application should identify files for deletion. The deletion service application can determine if any changes in storage have occurred since the last deletion process was facilitated. In particular, if previously extracted files in a previous set of candidate data files 1-N were not included in the deletion data file subset in performing the file selection function 224 and/or were identified by the user to be kept in response to user input to the deletion confirmation prompt 244, these files can be ignored by file extraction module 210 in future performance of the deletion process. In some embodiments, the file extraction module only extracts files that were not included in the set of candidate data files 1-N in any previous performances of the deletion process.

The user can select whether or not files determined to already be archived should be deleted from client device 100. For example, files already stored on an archive storage system 170 can be automatically identified for deletion. The deletion evaluation module 220 can determine that the candidate data file is also stored on an archive storage system 170 based on determining that the processing module 120 facilitated storage of the data file on the archive storage system 170 by previously transmitting the data file to the archive storage system 170 for storage via transceiver 130 and/or a different communication port. The deletion evaluation module 220 can determine that a candidate data file is also stored on an archive storage system by facilitating querying of the archive storage system 170 via the network 150, and receiving a response from the archive storage system 170 confirming that the data file is stored on the archive storage system 170. The deletion evaluation module 220 can determine that a candidate data file is also stored on an archive storage system by determining that the data file is stored on a server system associated with the corresponding application whose application data the data file is stored within. The deletion evaluation module 220 can determine that a candidate data file is also stored on an archive storage system by extracting user settings of a user account associated with the corresponding application that indicate that copies of data files of the application data including the data file are stored on the server system associated with the corresponding application. The deletion evaluation module can determine that the candidate data file is also stored on an archive storage system 170 in response to extracting metadata of the data file and/or a download history of the client device 100 to determine that the data file corresponds to a copy of a data file stored on an archive storage system or other external memory, where the data file was downloaded from the archive storage system via network 150. For example, a data file determined to have been downloaded from a server system via the Internet can be identified for deletion, as the data file is likely still stored on a different storage system and available for access. The deletion evaluation module can determine that the candidate data file is also stored on an archive storage system 170 based on extracting metadata of the data file to determine an originating source that created the data file is different from the client device 100. For example, a data file received via a messaging application, generated by a different client device before transmission to the client device 100, can be identified for deletion, as the data file is likely still stored on the different client device that generated the data file. The user can enter further deletion criteria indicating which of these various indicators that the data files is stored elsewhere and/or is available for access by the user via network 150 are valid in determining the data file is indeed archived. The user can enter further deletion criteria identifying whether some or all of a plurality of different archive storage systems 170 as discussed herein are acceptable and/or reliable archive storage systems 170, where only data files stored on the identified archive storage systems 170 are identified for deletion. Determining that a data file is archived can correspond to an automatic deletion factor or a deletion weighing factor utilized to generate the deletion score.

The user can select access history requirements, such as a minimum time frame since last access of a file used to determine if a file should be deleted. If last access to a data file is determined to have been longer than the identified minimum time frame, it can be identified for deletion. Determining that a data file has been not been accessed in accordance with the access history requirements can correspond to an automatic deletion factor or a deletion weighing factor utilized to generate the deletion score. The user can alternatively or additionally enter a required minimum frequency of access, a required number of times that the file was accessed within the time frame, and/or other access history requirements. These access history requirements can be the same or different for data files stored in different application data for different software applications; for different types of data files; for data files created by and/or received from different originating sources; and/or for other distinguishing characteristics differentiating different data files identified by the user. The access history of data files can be determined from metadata of the data file itself; metadata in the application data for the corresponding software application; and/or can otherwise be detected and recorded by processing module 120, for example, in conjunction with execution of the deletion service application and/or in conjunction with execution of the application that stores the data file. These access history requirements can similarly be set for software applications to be identified for uninstalling.

The user can select that software applications for which the user cancelled an account and/or subscription be uninstalled. Applications providing services associated with a user account for the user and/or providing services in exchange for regular payments provided by the user can be uninstalled if the user later deletes their user account, stops paying for the service, pauses their subscription, cancels their subscription, and/or never creates a subscription or account with the application after downloading the application. For example, if a user deletes their user account associated with a software application corresponding to a dating service, social media service, or other service hosted on a server system accessible via network 150, the corresponding software application can be identified for deletion. As another example, if a user cancels their subscription and/or stops making regular payments to a video streaming service, a music streaming service, a meal delivery service, or other service hosted on a server system accessible via network 150 that requires regular payments to continue providing the service to the user, the corresponding software application can be identified for deletion. Determining that a user account has been deleted and/or that a subscription has been cancelled can correspond to an automatic deletion factor or a deletion weighing factor utilized to generate the deletion score for software applications.

The deletion evaluation module 220 can extract relevant information from the application data of the corresponding application to determine that the user later deleted their user account with the application, stopped paying for the service provided by the application, pauses their subscription to the service provided by the software application, or cancels their subscription to the software application. The deletion evaluation module 220 can transmit a query to the server system associated with the software application via the transceiver 130, and can receive a response to the query via transceiver 130 indicating that the user account does not exist and/or that the user does not have a subscription for the service provided by the software application. The processing module 120 can track and/or record user interactions with the software application corresponding to creation and/or deletion of a user account, utilized by the deletion evaluation module 220 to determine when the user account has been deleted. The processing module 120 can track electronic payments made to the entity associated with the software application via other software applications corresponding to electronic payment services to determine that the user has stopped making regular payments to the entity the entity associated with the software application.

The user can select that software applications providing duplicate services be uninstalled. For example, software applications that correspond to competing entities providing the same type of service and/or software applications that are otherwise determined to be similar can be considered duplicate types of software applications. In some cases, duplicate types of software applications may be desirable, as a user may wish to have multiple game applications installed to play different games at different times; to have multiple video streaming applications installed to be able to select from differing content provided by the competing video streaming services; to have multiple dating applications installed to be able to potentially connect with more people; and/or to otherwise have multiple applications of the same type installed due to the multiple applications providing greater variety and/or opportunities. However, other types of software applications may be redundant if duplicate types of software applications are also installed. For example, a user is unlikely to desire use of multiple meal delivery services, as a single meal delivery service is likely sufficient in deliveries ingredients and/or pre-prepared meals to the user. In particular, a user may switch from using a first application to using a new application that the user prefers, and may forget to uninstall the first application and/or may forget to unsubscribe to the first application.

Determining that a software application installed on the client device is the same type as another software application installed on the client device can correspond to an automatic deletion factor or a deletion weighing factor utilized to generate the deletion score for software applications. The deletion evaluation module 220 can select one of a plurality of applications providing the same type of service to be kept, and can delete the other ones of the plurality of applications. For example, the similarity function 252 can be performed on software applications, and one of a similar set of software applications identified by performing similarity function 252 can be selected to be kept and/or the similar set of software applications can be ranked for deletion based on the deletion scores generated via deletion scoring function 222 as discussed in conjunction with FIG. 2B. The deletion scores can be generated as a function access frequency and/or access history, as a function of installation date, and/or as a function of subscription history. For example, the lowest deletion score can be assigned to the software application that is accessed most frequently, and this application can be designated to be kept while the other similar applications are identified to be uninstalled. In some embodiments, if the user has a user account and/or subscription with multiple similar applications, the deletion service application can facilitate deletion of the user's account of the similar applications that are to be uninstalled and/or cancellation of payments to cancel subscription of the similar application that are to be uninstalled. Alternatively, the GUI can present a prompt recommending that the user delete their account and/or cancel their subscription applications identified to be uninstalled and/or confirmed by the user to be uninstalled.

FIG. 4B presents an example embodiment of deletion criteria prompt 242 specifically relating to criteria utilized to delete image files, for example, from an application that stores photos, videos, or other image files. Some or all of these image files can be generated by client device 100, for example, taken by a camera of the client device 100; generated by a photo editing application installed on the client device 100 and/or an image file generating application installed on the client device 100; and/or captured as a screenshot by client device 100 of a GUI 145 in conjunction with execution of a particular software application or of other image data displayed by display device 140. Alternatively, these image files may have been downloaded by the client device 100 in response to being received from an archive storage system 170, a server system associated with a particular one of the plurality of software applications, and/or another client device via a messaging application installed on client device 100.

As used herein, originating source data of an image file can include an identifier of a particular camera of the client device utilized to capture the image; an indication that the image file corresponds to a screenshot taken by the client device 100; an identifier of one of the plurality of software applications was being run with its GUI currently displayed on the display device when an image file corresponding to a screenshot was captured; an identifier of one of the plurality of software applications utilized to generate, edit, and/or download the image file; an identifier of one of a plurality of contacts of the user from which the image file was received and/or by which the image file was originally generated; an identifier of a particular client devices from which the image file was received; geolocation data generated by the client device 100 or a different client device 100 in conjunction with capturing the image data via a camera; timestamp data generated by the generated by the client device 100 and/or a different client device 100 indicating a time the image data was captured, edited, and/or downloaded; and/or other information indicating when, where, and/or how the image file was generated, edited, and/or downloaded to client device 100.

In some embodiments, some or all of this originating source data can be weighted and/or ranked by the user, and/or otherwise can be utilized to determine which image files should be deleted, based on their originating source. For example, photos taken by the user via the camera of their own client device 100 may be more valuable to the user than photos downloaded from elsewhere. Photos taken in particular locations may be more valuable to the user than photos taken in other locations. As discussed previously, whether an image was downloaded via a software application such as a web browser application, a social media application, and/or a messaging application may be indicative that the image file is saved on other devices and/or is accessible to the user via other locations. This may also be indicative that the image is less valuable to be saved because it wasn't taken by the user.

Furthermore, the type of camera used to capture a photo may be indicative of whether or not the photo should be preserved long term. For example, a user of a client device corresponding to a mobile device may take more purposeful photos with the rear-facing camera their mobile device to capture landscapes, architecture, group photos, and/or other photos that the user may intend to preserve and revisit for longer periods of time after they are taken. The user may take less purposeful photos with their front-facing camera to take pictures of their own face and/or body that the user has less desire to keep and/or revisit long term, and instead are intended for short-term amusement, for transmission to a friend or other contact via a messaging application. Similarly, screenshots may be taken for short term use, for example, for transmission to a friend or other contact via a messaging application and/or for short term reference.

The user can prioritize these originating sources by selecting rankings and/or weights for any of these originating sources, based on their own personal usage of various types of image files. The originating sources of image files in particular can be utilized as deletion weighting factors and/or preservation weighting factors, where the rankings and/or weightings are utilized in generating the deletion score. Alternatively, some or all of the originating sources can correspond to automatic deletion factors and/or automatic preservation factors. For example, as illustrated in FIG. 4B, the user can select that photos captures via the front-facing of the client device and/or captured via a screenshot be selected for deletion. This automatic selection can be contingent on one or more other deletion factors, for example, where these photos are only selected for deletion if they also compare unfavorably to a minimum access frequency threshold set by the user or a minimum time frame since latest access set by the user as discussed in conjunction with FIG. 4A.

Furthermore, as discussed previously, the user can select that duplicate image files be deleted. For example, all but one of a group of identical image files can be deleted by the deletion service application, where this group of identical image files is determined to exactly match or be substantially identical by performing the similarity function 252 with a similarity threshold that requires the image data of the image files in the group be exactly or substantially identical. For example, the similarity function can include performing a pixel comparison of pixels in the same location for two different image files to determine whether or not most or all of the pixels have the same and/or very similar pixel value.

The user can select that image files that have been transferred to an archive storage system 170 and/or other external storage be deleted. For example, the user can specify that image files uploaded to a social media profile be deleted and/or can specify that image files transmitted via a messaging application be deleted. The user can further indicate particular applications where, if an image file in the application data of the particular application is determined to be transmitted to a server system associated with one of the particular applications and/or is otherwise determined to be transmitted via transceiver 130 in conjunction with execution of one of the particular applications, trigger selection of the image file for deletion. These identified particular applications can be the same or different from the application that stores the image file in its application data.

FIGS. 4C and 4D illustrate examples of deletion criteria prompts utilized to determine deletion criteria based on content of image files. In some embodiments, the deletion evaluation module 220 can perform a characterization function on content corresponding to the image data of some or all image files in the candidate set of data files 1-N. The input of the characterization function can include pixel values of the image data of the image file and/or the originating source data or other metadata of the image file. The output of the characterization function can include characterizing information about the content of the image file. Performing the characterization function can include utilizing a computer vision model to perform a computer vision function to perform feature detection and/or feature identification. The output can include identifiers of particular types of features detected in the image file, whether or not faces or people are detected in the image file, identifiers of the people detected in the image file based on utilizing a facial recognition function for the people detected in the image file, a horizon line detected in the image file, natural features and/or landmarks detected in the image file, text detected in the image file, logos detected in the image file, or other features detected in the image file. Performing the characterization function can include determining the size, orientation, and/or location of detected features in the image file, where the output includes metrics characterizing the size, orientation, and/or location of detected features within the image file. Performing the characterization function can include generating color histograms for image files by evaluating some or all pixel values of the image file and/or comparing colors in neighboring regions of the image file where the output includes metrics characterizing the colors, brightness, contrast, sharpness, or other features of the photo. Some or all of this information can be determined by another software application and/or some or all of this information can be already included in metadata of the image file, where the characterization function extracts this information from the metadata. Performing the characterization function can include utilizing a machine learning model trained on a plurality of images of a training set in conjunction with identifiers of features known to be included in the plurality of images.

Some or all of the automatic deletion factors, deletion weighing factors, automatic preservation factors, and/or preservation weighing factors can correspond to the presence of particular features detected in the image data; the size, orientation, and/or location of the detected features; the colors, brightness, contrast, sharpness of the image data; and/or other aspects of the characterization data.

For example, as illustrated in FIG. 4C, automatic preservation factors, and/or preservation weighing factors can correspond to the detection of any face in an image, the detection of the face of the user in an image, and/or the detection of a face of one of more particular people identified by the user. The deletion evaluation module 220 can determine if a face detected in the image matches a face of the user and/or a face of a particular person, such as one of a plurality of contacts extracted from application data of a contacts application, a messaging application, and/or a social media application. The deletion evaluation module 220 can determine facial characteristics that distinguish the user and/or one of the particular people identified by the user by processing at least one other image files that include the user and/or the other particular people. These photos can be retrieved from a social media account of the user, a social media account of the particular people, from a contacts application, and/or from another application that stores photos and/or accesses photos via network 150 with corresponding metadata indicating identifiers of people included in the photo. A facial recognition application can utilize these other photos known to include the user or the particular people to determine whether other photos included in the set of candidate data files 1-N include these people. Alternatively, metadata of the image files can indicate whether the user is included in the file and/or whether other particular people are included.

In some embodiments, if a photo is determined to have been captured by a front-facing camera of the client device 100, a face detected in the photo can automatically be determined to correspond to the user. In some embodiments, if a photo is determined to have been captured by a front-facing camera of a different client device, and if the photo is determined to have been received by client device 100 from a particular contact of the user via a messaging application or a social media application, a face detected in the photo can automatically be determined to correspond to the particular contact.

The user can select that photos taken in particular locations be saved. In particular, locations that are far from the user's home may be indicative of photos taken during travel and/or at significant locations that may be more valuable to the user. The user can select that photos taken at least a threshold distance away from the location of their home, and/or at least one other location selected by the user, be saved. Alternatively or in addition to saving photos that were taken outside of a selected location area, the user can elect to save photos taken within a selected location area, such as a vacation city selected by the user and/or other location area selected by the user. For example, the user may alternatively elect that photos taken within range of their home be automatically saved.

The user can enter the address or other location data for their home, work, and/or or for any other frequently visited location. Alternatively, the geolocation data collected by the client device 100 such as GPS data and/or cellular data identifying the location of client device 100 can be utilized by the deletion service application to automatically determine the location of the user's home, work, and/or other frequently visited location, for example, based on determining the current location, determining one or more frequently visited locations by client device 100, and/or determining a location that the client device tends to be located between 2 am and 4 am or other timeframes that the user is likely to be asleep at their home. Alternatively, application data and/or user account data of a map application, ride sharing application, retail delivery application, grocery delivery application, meal delivery application, or other application that stores the user's home address and/or work address can be extracted from memory and/or received via network 150 for utilization in determine the location of the user's home.

The user can similarly enter the address and/or city name for vacation locations and/or other locations where photos should be saved. Alternatively, the geolocation data collected by the client device 100 such as GPS data and/or cellular data identifying the location of client device 100 collected during a weekend, collected during a holiday, and/or collected at a time that the user is determined to be on vacation can be utilized to determined vacation locations. Alternatively or in addition, application data and/or user account data of a travel booking application, such as an airline booking application, a hotel reservation application, a travel review application, a restaurant review application, and/or an excursion booking application, can be extracted from memory and/or received via network 150 to determine when and/or where a user was traveling. Alternatively or in addition, application data and/or user account data of a social media application and/or event booking application can be utilized to determine events that the user has RSVPed to, has purchased tickets for, and/or has otherwise planned to attend and/or already attended. The user can select which of these software applications be utilized in determining events the user attended, and photos captured by the client device during the time of an event the user attended and/or at the location where an event the user attended was hosted can be identified.

These locations and/or events selected by the user can be compared to geolocation data or other location information of originating source data of image files in the set of candidate data files 1-N to determine whether these photos were taken within a particular location identified by the user as a location where photos, if taken in the location, should be preserved. Similarly, the locations can be compared to geolocation data or other location information of originating source data of image files in the set of candidate data files 1-N to determine whether these photos were taken outside a particular location identified by the user as a location where photos, if taken outside the location, should be preserved.

The user can alternatively and/or additionally identify other locations that photos, if taken within or outside these other locations, be automatically deleted. These other locations can be compared to geolocation data or other location information of originating source data of image files in the set of candidate data files 1-N to determine whether photos should be identified for automatic deletion. Alternatively, various locations can correspond to deletion weighing factors and/or preservation weighing factors with user configured weights utilized to generate the deletion score. The corresponding value can be a binary value indicating whether or not the image file was captured, generated, and/or downloaded in a particular location. Similar criteria can be utilized to determine whether other types of data files be deleted based on whether they were captured, generated, and/or downloaded in a particular location identified by the user.

The user can alternatively or in addition identify timeframes for deletion and/or preservation, where data files generated, captured, and/or downloaded within the timeframe are deleted and/or preserved accordingly.

The user can identify that photos received from particular contacts of one or more contact applications, messaging applications and/or social media applications be automatically preserved. The user can identify the same and/or different set of contacts for different applications, or can indicate that photos received from a contact via any application be preserved. This can include comparing the originating source data of image file in the set of candidate data files 1-N to the set of contacts identified by the user to determine whether the image file was sent by the identified contacts. The user can similarly identify that photos received from particular contacts of one or more contact applications, messaging applications and/or social media applications be automatically deleted. Alternatively, various contacts from which photos are received can correspond to deletion weighing factors and/or preservation weighing factors with user configured weights utilized to generate the deletion score. The corresponding value can be a binary value indicating whether or not a particular contact sent the image file. Similar criteria can be utilized to determine whether other types of data files be deleted based on whether they were sent by particular contacts identified by the user.

The user can select that photos downloaded via execution of a particular software application be preserved, that photos generated and/or edited via execution of a particular software application be preserved, and/or that screenshots taken of a GUI displayed in conjunction with running of a particular software application be preserved. The user can similarly select that photos downloaded via execution of a particular software application be deleted, that photos generated and/or edited via execution of a particular software application be deleted, and/or that screenshots taken of a GUI displayed in conjunction with running of a particular software application be deleted. Alternatively, various software applications executing in conjunction with download of an image file, generation of an image file, or screenshot of an image file can correspond to deletion weighing factors and/or preservation weighing factors with user configured weights utilized to generate the deletion score. The corresponding value can be a binary value indicating whether or not a particular application was running to download the image file and/or to capture a screenshot. Similar criteria can be utilized to determine whether other types of data files be deleted based on whether they were generated by and/or downloaded by particular applications identified by the user.

The user can indicate that if the photo was added by the user to an album of a photo application of the client device 100, that it should be preserved. The user can indicate that if the photo was added by the user to an album of a photo application the client device, that it should be deleted. Whether a photo was added to one of a plurality of particular albums can utilized as deletion weighing factors and/or preservation weighing factors. The corresponding value can be a binary value indicating whether or not the image file was added to a particular album. Similar criteria can be utilized to determine whether other types of data files be deleted based on whether they are added to particular folders and/or storage locations of one or more particular applications in storage on client device 100.

In some embodiments, screenshots, photos captured by a camera of client device 100, and/or downloaded photos may be utilized by the user store important information for easy reference at a later time. Such image files can include text or other data that the user may wish to reference at a later time. These image files can correspond to images of recipes, passcodes, confirmation numbers, reservation details, membership numbers, photo identification cards, credit cards, two-step authentication access codes, business cards, event tickets, receipts, menus, messaging history screenshotted from a messaging application, barcodes, QR codes, tags identifying clothing or other retail, and/or other information the user may wish to reference at a later time. The user can select which ones of these types of information should be saved and/or deleted if included in image files stored in memory. The user can rank and/or weight these different types of information to be utilized as preservation weighing factors and/or deletion weighing factors. The corresponding value can be a binary value indicating whether or not the image file includes the particular type of information.

The output of the characterization function performed on image files can indicate whether text is present and/or can indicate whether the image includes one of these particular types of information. In some embodiments, performing the characterization function includes performing a natural language processing function on text identified in the image to differentiate between these different types of information. A computer vision function utilized in performing the characterization function can further utilize known layouts, fonts, colors, dimensions, and/or GUIs utilized in the portrayal of these different types of information. Furthermore, the originating source data can be utilized by the characterization function in determining which type of information is included in the image file. A machine learning model can be utilized by the characterization function, where the machine learning model is trained on a plurality of images, text extracted from images, and/or corresponding originating source data, for example, where the plurality of images and/or text extracted from images are labeled with a known one of the plurality of types of information.

For example, a screenshot taken of a GUI displayed by an airline application may be determined to include an airline ticket and/or confirmation number based on the originating source data indicating the airline application and/or based on the text in the image data including known airport codes, times, a name of an airline, a name of a type of airplane, and/or the words "boarding time." A photo taken by a camera of the client device with geolocation data that compares favorably to the location of a restaurant can be determined to correspond to a menu based on the originating source data indicating the photo was taken in a restaurant, based on the text in the image data including a plurality of words corresponding to food items in conjunction with a plurality of prices, based on the text including headers such as "appetizers", "entrees", and "desserts", and/or based on other information distinguishing the menu.

In some cases, these image files may be desirable for a temporary amount of time. For example, a screenshot of a ticket and/or confirmation email may only be desirable up until the time of the event and/or travel for which the ticket and/or confirmation email is needed. In these cases, an event time and/or travel time indicated on the ticket can be extracted from the image data automatically, and can be utilized to determine how long the photo should be stored, where the photo is deleted at a time after the time and/or date posted on the ticket and is preserved before a time and/or date posted on the ticket.

As another example, a screenshot of a receipt may only be desirable until the user requests payment and/or receives payment as reimbursement for some or all of the purchase reflected by the receipt via a payment application. The photo can be deleted at a time after the processing module 120 detects that payment for a line item and/or total amount listed on the receipt is requested and/or received via a payment application of the client device 100. The photo can be deleted at a time after the processing module 120 detects and/or that a payment with a memo indicating a date and/or retailer associated with the receipt has been requested and/or received. Alternatively or in addition, the user can indicate an amount of time that some or all of these particular types of information be stored, where the amount of time is the same or different for different types of information.

The user can indicate that image files with other particular features be automatically saved and/or deleted. For example, photos of famous scenery, famous landmarks, famous buildings, famous statues, and/or other iconic features can be automatically saved if detected. These landmarks can be detected utilizing the computer vision function and/or the originating source data indicating the photo was captured by a camera of the client device and/or indicating that the photo was captured in a location where the famous feature is known to be located. As another example, photos of sunsets, sunrises, and/or other photos identified by the user as visually appealing can be automatically saved. In some embodiments, the user can upload and/or indicate example image files that include particular features and/or that are indicative of a particular quality and/or style of photo that as worth preserving. This can include such photos of pets, photos similar to other photos posted to social media, and/or photos with other features and/or characteristics the user indicates is worth preserving, as discussed in further detail in conjunction with FIG. 4E.

FIG. 4D illustrates another embodiment of deletion confirmation prompt 244 utilized to identify particular criteria for photos that should be identified for deletion in the deletion process. The user can select to delete photos determined to include no faces. The user can select to delete photos determined to include no faces of people that are friends and/or contacts of the user, for example, identified as friends or contacts of the user in a social media account of the user and/or in a contacts application of the user. The user can select one or more social media applications, messaging applications, and/or contacts applications to be utilized to determine the contacts of the user. Facial recognition can be applied to determine whether or not a face in the photo corresponds to a face of a social contact based on metadata of the image file, and/or based on example photos of the contacts supplied by the user or downloaded from the server corresponding to the selected software application by utilizing the user account.

The user can select to delete photos that include faces of particular undesirable people identified by the user and/or based on example photos of the particular undesirable people provided as examples by the user. The user can alternatively select that photos be deleted if they include people that the user has deleted from their contacts in a contacts application and/or messaging application; people that the user has blocked from sending telephone calls, text messages, and/or other messages via a messaging application to the client device; people that the user has unfollowed and/or unfriended in a social media application; and/or people that send messages to the user via a messaging application that the user does not responding to and/or responds to with a lower frequency. The user can alternatively or additionally select that photos or other files, received from messaging accounts and/or client devices associated with these people via a messaging application, be identified for deletion. The user can alternatively or additionally select that photos or other files downloaded from a social media application be identified for deletion if these photos or other files were determined to have been uploaded to the social media application in conjunction with social media accounts associated with these people and/or via client devices determined to be associated with these people.

In some embodiments, the deletion service system can automatically detect a person with which the user has been determined to have discontinued a romantic relationship or friendship relationship. This can include extracting various application data for various software applications installed on the client device, evaluating access history to various software applications installed on the client device, and/or can include receiving, via network 150, user account information from one or more server systems associated one or more software applications installed of the client device. This can include first detecting that the user was in a romantic relationship with the person at a previous time, and later determining the user is no longer in the romantic relationship with the person at a later time.

Detecting the user has discontinued a romantic relationship with a person can include determining a change in social media relationship status of a user account of the user and/or of the person received from a server system of a social media application; based on recent installation and/or at least a threshold increase in frequency of interaction with of one or more dating applications by the user; based on detecting at least a threshold decrease in terms of endearment, romantic emoticons and/or romantic language in text of messages sent and/or received via messaging applications to the person; based on detecting at least a threshold increase in terms of endearment, romantic emoticons and/or romantic language in messages sent and/or received via messaging applications to a different person; based on detecting least a threshold decrease in volume of messages and/or other communications sent to and/or received from the person via one or more applications; based on geolocation data of the client device indicating that a frequency of time spent at a location associated with the person's home has decreased by at least a threshold amount; and/or based on other information extracted from application data of one or more software applications stored on the client device 100 and/or received via the network 150 as user account data received from server systems associated with one or more software applications installed on the client device 100.

In some embodiments, detecting the user has discontinued a romantic relationship with a person can include determining a frequency of use of at least one emoticon determined to be associated with romance has decreased by at least a threshold amount in messages exchanged between the user and the person in at least one messaging application. Detecting the user has discontinued a romantic relationship with a person can include determining a volume or frequency of photographs included in the messages exchanged between the user and the person has decreased by at least a threshold amount. Detecting the user has discontinued a romantic relationship with a person can include determining a volume or frequency of photographs that were specifically determined to have been taken by a front-facing camera of the client device has decreased in the messages exchanged between the user and the person by at least a threshold amount. Detecting the user has discontinued a romantic relationship with a person can include performing a computer vision function on each of the photographs exchanged in messages between the user and the person, and determining whether the user and/or the person is included in ones of the photographs, where the relationship is determined to be discontinued in response to determining that a volume or frequency of photographs included in messages exchanged between the user and the person that are determined to include the user in the and/or the person has decreased by at least a threshold amount.

In some embodiments, the user will be prompted to confirm that a romantic relationship with this person has ended and/or will be prompted to confirm that photos that include this person should be identified for deletion. In some embodiments, if at least a threshold number of other people are also included in the photo, the photo will not be identified for deletion.

In some embodiments, the inverse of some or all of these conditions can be detected to determine the user has begun or is in a romantic relationship or friendship relationship with a person. This can include, for example, detecting threshold volume and/or threshold amount of increase in of terms endearment exchanged between the user and a particular person via messaging applications, a threshold volume or threshold amount of increase in transmission of particular types of files such as photos that include the user and/or photos taken via front-facing camera exchanged between the user and/or particular, determining the user has uninstalled all of their dating applications that were installed on the client device, and/or based on determining other factors indicating the user has begun or is in a relationship. This person with which the user is determined to be in a relationship can thus be the person later determined to no longer be in a relationship with the user as discussed above.

Photos or other files, received via a messaging application from messaging accounts and/or client devices associated with the person with which the romantic relationship has ended can be automatically identified for deletion. Photos or other files downloaded from a social media application can be identified for deletion if these photos or other files were determined to have been uploaded to the social media application in conjunction with social media accounts associated with the person with which the romantic relationship has ended, and/or via a client device determined to be associated with the person with which the romantic relationship has ended.

The user can select to delete photos determined to include at least a threshold proportion of people that are not smiling, that have their eyes closed, and/or or are not exhibiting another desirable facial expression, static pose, or action pose indicated by the user. The user can indicate that all people, or at least a selected threshold proportion of people, must not exhibit the undesirable desirable facial expression, static pose, or action pose for a photo to be preserved. The user can similarly indicate that all people, or at least a selected threshold proportion of people, must exhibit a desirable facial expression, static pose, or action pose for a photo to be preserved. The facial expression, static pose, or action pose exhibited by each person in the photo can be identified in output of the characterization function. In some embodiments, examples of desirable undesirable facial expressions, static poses, or action poses can be indicated in example image files selected by the user as discussed in conjunction with FIG. 4E.

Figure 4E:
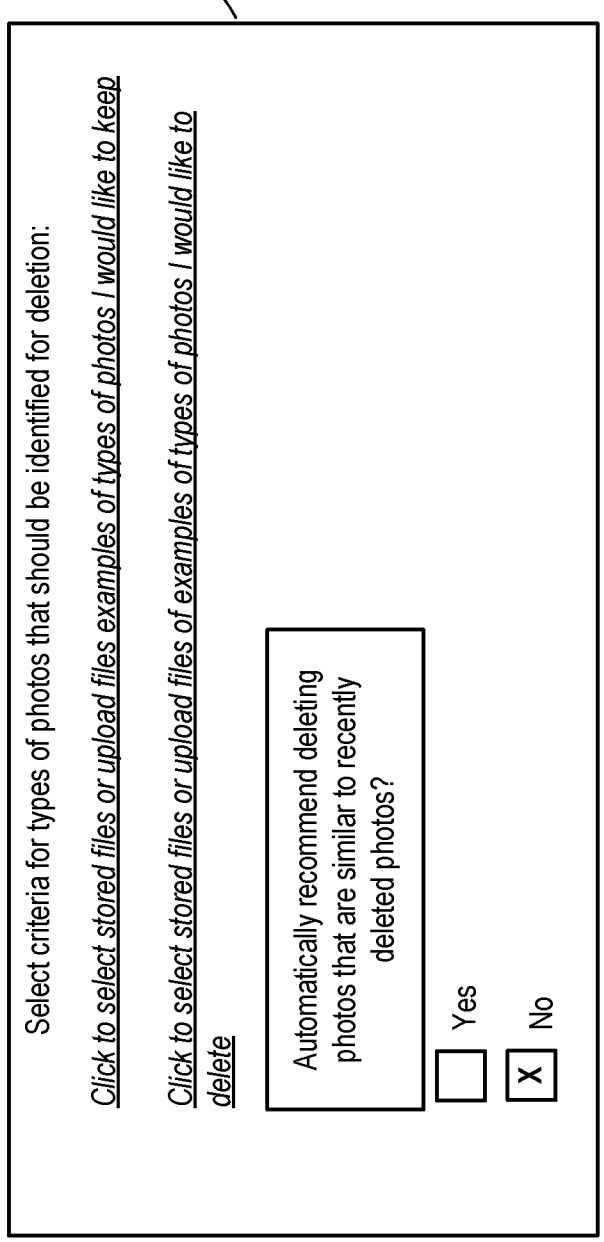

In some embodiments, this can be applied to determine whether or not attempted action shots were successful, for example, where an action pose of a person in the photo is compared to a plurality of successful example action poses and/or a plurality of example failed action poses of the same type or different types, for example, included in example image files selected by the user as discussed in conjunction with FIG. 4E. The output of the characterization function can otherwise indicated whether or not the action shot attempted in the pose is successful.

In some embodiments, this can be applied to attempted group action shots to determine whether all and/or at least a threshold number of people in the photo successfully accomplished the action pose. This can include first determining whether the group action pose was attempted by detecting that at least a threshold number of people in the photo successfully executed the action pose and/or by detecting that detecting that at least a threshold number of people in the photo exhibit poses associated with failed attempts of the action shot. This can further include determining whether a photo determined to correspond to a group action pose was successful by detecting that all of the people in the photo or at least a threshold number of people in the photo exhibit poses corresponding to successful execution of the action pose. This can further include comparing the pose exhibited by each person and determining whether any people are exhibiting poses that are dissimilar from the average pose across all people in the photo by at least a threshold amount. Successful group action shots can be identified for preservation and/or failed group action shots can be identified for deletion. Alternatively, success and/or failure of an attempted group action shot can correspond to deletion weighing factors and/or preservation weighing factors with user configured weights for different types of action shots utilized to generate the deletion score. The corresponding value can be a binary value indicating whether or not a particular type of action shot determined to have been attempted was successful. Alternatively, the corresponding value can be a discrete or continuous value, resulting in a lower deletion score when the action shot is more difficult and/or is successfully completed by more people and resulting in a higher deletion score when the action shot is less difficult and/or is successfully completed by less people.

For example, consider an attempted jumping photo, corresponding to a photo of a group of people attempting to all jump in the air at the same time. The photo can be determined to correspond to an attempted jumping photo in response to detecting that at least one person, and/or at least a selected threshold proportion of people, are successfully jumping, are in the air, are not touching the ground, and/or are complete above the horizon line of the photo. The photo can be determined to correspond to an attempted jumping photo in response to detecting that the group of people are all lined up and facing the camera. Once the photo is determined to be an attempted jumping photo, it can further be evaluated as to whether or not it corresponds to a successful jumping photo. An attempted jumping photo can then be determined to be a successful jumping photo in response to detecting that all of the people in the photo, or a selected threshold proportion of people in the photo, are in the air, are not touching the ground, and/or are complete above the horizon line of the photo. If this condition is not met, the attempted jumping photo can then be determined to be a failed jumping photo. In some embodiments, an attempted jumping photo is determined to be a successful jumping photo in response to detecting that the feet, knees, and/or bottom portion of each person in the photo is within a threshold distance from the ground. For example, feet can be detected in response to detecting footwear in the photo, in response to detecting a logo known to be associated with footwear, and/or by otherwise detecting feet.

In some embodiments, determining whether an attempted jumping photo is a successful jumping photo includes determining the distance between the lowest portion of the body of every person in the photo and the ground. This can include calculating or estimating actual distances from the ground based on the scale of the people in the photo and an average human height. This can include calculating or estimating these distances from the ground based on a determined height and/or orientation of the camera based on the location of the horizon, based on the location of buildings, geometric features, and/or other features in the photo, and/or based on gyroscope and/or accelerometer data included in metadata of the image file. These distances can alternatively be calculated between the lowest portion of the body of every person in the photo and the bottom of the photo. Determining that an attempted jumping photo is a successful jumping photo includes performing a function on all of these calculated distances. For example, in response to determining that the difference between the maximum distance and the minimum distance is within a threshold height, the attempted jumping photo can be determined to be a successful jumping photo, and is determined to be a failed jumping photo otherwise. In response to determining that the difference between any one of the distances and the mean distance is within a threshold deviation height, the attempted jumping photo can be determined to be a successful jumping photo, and is determined to be a failed jumping photo otherwise.

The user can indicate that photos that are blurry or are otherwise of a low quality be deleted. The user can specify that photos that are too dark, too bright, washed out, and/or otherwise obscure subject of the photo be removed. The user can specify threshold average pixel values of the photo, and/or can indicate different locations of the photo, such as borders of the photo, that should have threshold average pixel values. For example, grayscale, RGB, and/or other pixel thresholds selected by the user that correspond to a darkness threshold, a brightness threshold, and/or thresholds for particular colors. These threshold pixel values can be compared to average pixel values determined for pixels within all of the image and/or a particular region of the image. If the average pixel values compare unfavorably to one or more threshold pixel values, the photo can be identified for deletion and/or can correspond to deletion weighing factors that cause the photo to be assigned a higher deletion score.

The user can also specify that photos that obscure the face of at least one person in the photo, or at least a threshold number of people in the photo, be deleted. The user can specify that if at least a selected percentage of the user's face is determined to be covered, cropped, blurry, and/or otherwise obscured, that the photo be identified for deletion and/or corresponds to a deletion weighing factor that causes the photo to be assigned a higher deletion score. The user can similarly specify that other desired features, if obscured by more than a selected threshold amount, also be identified for deletion and/or be assigned a higher deletion score.

The user can specify that crooked photos be identified for deletion. The user can specify a threshold maximum angle at which the detected horizon line can deviate from relative to the line parallel to the bottom or top of the photo. The user can similarly specify other threshold angles for other detected orientation of one or more other detected features of the photo, such as people, faces, or buildings. If a detected horizon line in a photo, or other implicit vector dictating orientation of another feature relative to the frame of the photo, exceeds or otherwise compares unfavorably to the threshold maximum angle, the photo can be identified for deletion. Alternatively the angle of deviation from the line parallel to the top and bottom of the photo can correspond to a deletion weighing factor, where the value of this deletion weighing factor is a function of the angle between the line parallel to the top and bottom of the photo and the line corresponding to the horizon line in the photo.

The user can specific that photos be targeted for deletion because they violate one or more other rules of proper photographic composition such as a rule of thirds or a rule of contrast. Considering the rule of thirds, a subject of the photograph such as a face or object is identified and located in a photo. The location of the subject is compared to a rule of thirds grid (3×3) having four points of interest corresponding to the vertices of the central square of the grid. If the location of the subject does not intersect with one of these four points of interest, then the photo violates the rule of thirds. Furthermore, a contrast distribution can be analyzed to determine of sufficient contrast is present in the photo. In this fashion, photos where subjects are not located so as not to properly intersection the rule of thirds grid or not having sufficient contrast, can be targeted for deletion.

FIG. 4E presents another embodiment of deletion confirmation prompt 244. The user can indicate that image files similar to other example image files be identified for deletion and/preservation. The user can be prompted via deletion criteria prompt 242 to select examples of one or more image files stored by one or more applications that is similar to other image files stored on client device 100 that the user wishes to be preserved and/or deleted, where the example image files correspond to the one or more image files selected by the user. The user can be prompted via deletion criteria prompt 242 to upload one or more image files that are similar to image files stored on client device 100 that the user wishes to be preserved and/or deleted, where the example image files correspond to the one or more image files uploaded by the user. The user can be prompted via deletion criteria prompt 242 to take one or more pictures via a camera of client device 100 that are similar to image files stored on client device 100 that the user wishes to be preserved and/or deleted, where the example image files correspond to the one or more image files uploaded by the user.

For example, photos of particular features identified as important to the user, such as the user's pet, can be automatically saved. In these cases, these features may require that the user select a saved image file and/or upload one or more pictures of the pet or other important feature identified by the user. For example, example image files of a user's dog can be utilized by the deletion evaluation module to, for example, distinguish the user's dog from pictures of other dogs taken by the user, where pictures of the user's dog are saved and/or are higher prioritized for preservation that pictures of other dogs.

The example image files for deletion and/or example image files for preservation can be processed to determine the most prominent commonality between the image files, such as type, size, orientation, and/or location of features detected in at least a threshold number of the example image files; color characteristic, contract characteristics, brightness characteristics and/or sharpness characteristics that are common to at least a threshold number of the example image files; and/or originating source data and/or other metadata of the example image files common to at least a threshold number of the example image files. The processing can further include distinguishing the most prominent characteristics that differentiate the example image files for deletion and the example image files for preservation. This can include performing a clustering function on the example image files to identify different prominent features distinguishing different groupings of the example image files.

Processing the example image files for deletion and/or example image files for preservation can include training a machine learning model on the example image files. The trained machine learning model and/or determined commonalities can be utilized to perform a similarity function and/or a detection function on image files of the set of candidate data files 1-N. The similarity function can be the same or different from similarity function 252. In particular, similarity function 252 can be utilized to identify exactly or substantially identical image files based on strict a similarity threshold, while this similarity function can be instead utilized to identify image files with similar characteristics and/or detected features as the example image files based on a looser similarity threshold.

The output of the similarity function can include a similarity score, where an image file is determined to be similar to the example image files if the similarity score compares favorably to a similarity threshold. The output of the similarity function can indicate whether the input image file is the most dissimilar file amongst the grouping of the example image files and the input image file, where the image file is determined to be similar to the example image files if the input image file is not the most dissimilar file amongst the grouping of the example image files and the input image file and/or is not furthest from a mean image file generated for the grouping. The output of the detection function can include an indication of whether or not one or more features, determined to be included in some or all of the example image files, was also included in the input image file. If at least a threshold number of features common to at least a threshold number of the example image files are determined to be included in an input image file, it can be determined to be similar to the example image files. The input image file can be preserved if it is determined to be similar to the example image files for preservation, and/or a value corresponding to a preservation weighing factor can be a function of the similarity score determined for the input image file. The input image file can be identified for deletion if it is determined to be similar to the example image files for deletion, and/or a value corresponding to a deletion weighing factor can be a function of the similarity score determined for the input image file.

In some embodiments the example image files can correspond to files that were not manually selected by the user. For example, the user can indicate via GUI 145 that other image files that are determined to be similar to previously deleted files also be identified for deletion, and/or these files can be identified for deletion automatically. Example image files for deletion can thus correspond to files determined to have been previously deleted from memory module 110 by the user of client device 100 via interaction with the corresponding software application and/or via interaction with the deletion confirmation prompt 244 in conjunction with a previous deletion process of the deletion service application. Deletion of these files via other applications can be tracked and/or logged by the processing module 120 for use by the deletion service application. These previously deleted files can be automatically processed before deletion, for example, where these files are processed by the characterization function and/or where the machine learning model is trained and/or updated based on newly identified files for deletion. Similarly, files that are identified for deletion that the user selects to keep in previous deletion processes of the deletion service application can be utilized as example data files for preservation, and can be utilized to ignore similar files to these example data files for preservation in future deletion processes.

As another example, the user can indicate via GUI 145 that other image files that are determined to be similar to files previously uploaded to social media identified for preservation automatically. For example, image files similar to other image files that were uploaded to a particular social media application should be saved, as they might correspond to photos the user associates with being of a higher quality and/or being worthy of sharing. Images uploaded to identified social media applications can be utilized as example image files for preservation. For example, the processing module 120 can process image files as they are uploaded to a social media application to generate and/or update the machine learning model based on newly uploaded photos. As another example, the deletion service application can temporarily download files that were previously uploaded to the user's social media account to generate and/or update the machine learning model. In some embodiments, a version of the image file that corresponds to an original image that is unedited by applying filtering and/or other editing via execution of the social media application prior to posting to the social media account is extracted and/or fetched from memory module 110. This can be ideal in ensuring that similar photos are identified in their original unedited state, as this editing can be accomplished once the user determines to post the photo to social media. In some embodiments, image files are only saved if they are determined be similar to the example image files uploaded to social media, but also not a duplicate and/or substantially identical to any of the example image files as determined by performing similarity function 252. In some embodiments, if these image files are later determined to have been posted to a user account of the same or different social media application utilized to identify the example image files, these can be identified for deletion. In some embodiments, these similar image files are displayed to the user via a prompt displayed via GUI 145 recommending that these similar image files be posted to social media, where the most image files determined to be most similar to the example image files are recommended and/or displayed first. The deletion service application can facilitate uploading of a selected image file from the list of presented recommendations to the server system associated with the social media application via the user account, and/or can further facilitate deletion of the image files that were not selected to be posted to the social media application.

FIG. 4F illustrates criteria utilized to identify photos that are redundant and/or substantially identical. For example, if a user took several photos with a same camera of the client device within a same time frame and/or took several screenshots on the client device within a same time frame, it is likely that a user was attempting to capture a particular shot, for example, by testing different angles of the camera, different filters, different poses of people in the picture, and/or by using different scenery as backdrops. As a particular example, the user may take a series of pictures of their face with their front-facing camera and/or a series of pictures of their body by utilizing a mirror and their rear-facing camera to attempt to capture a shot with the best facial expression, a shot with best lighting, and/or a shot with a head at an angle or body in a pose that best accentuates their face, makeup, hair, or outfit. As another particular example, the user, or a different person operating a camera application of the client device 100, may take a series of photos in an attempt to capture an action shot or a group action shot in rapid succession to capture multiple shots of a single attempt of performing the action, and/or to take a series of photos corresponding to multiple attempts of performing the action. These photo shoots may result in dozens or hundreds of photos being stored on the camera, where the user only intends to keep one or two photos of a photo shoot in storage and/or for upload to a social media application.

The user can select how many photos of the same photo shoot be preserved, and/or can select whether or not the photos to be preserved are automatically selected by the deletion service application and/or are selected by the user. The user can also indicate an amount of time that is utilized to dictate that photos are included in the same photo shoot. For example, the user can select that any set of photos taken within the same three minute time frame be identified as a photo shoot. The user can further indicate that a selected threshold minimum number of photos taken within the selected amount of time are required to identify the set of photos as a photo shoot, for example, by identifying that a set of photos are to be identified as a set of photos in a photo shoot only if the set of photos includes at least ten photos are taken within the three minute time frame. This criteria can be utilized by the similarity function to identify similar data file subsets. These groupings can further be generated based on determining content of the image files in the same group is similar, that scenery in the image files in the same group is the same or similar, that a landmark, building, or other feature detected in the all of the image files in the same group is the same, that all of the image files in the same group includes the same group of people and/or at least a threshold number or a threshold proportion of same people, and/or that the people of the image file are executing and/or attempting the same type of pose in all of the images. Some of this criteria can be utilized to distinguish different groupings of photos taken within the same time frame, for example, where a first grouping includes a group of people attempting one pose with a first backdrop and where a second grouping includes the group of people attempting a different pose with a different backdrop. In some embodiments, at least one photo is selected to be preserved for each of these different groupings of photos taken within the same time frame, unless otherwise identified for deletion by the user.

All photos in the same photo shoot can be ranked in accordance with deletion scores generated as discussed previously, where a photo with a lowest deletion score and/or a set of photos with lowest deletion scores are preserved. Some photos can automatically be identified for deletion and/or otherwise removed from consideration to be preserved if they meet automatic deletion criteria. A first photo in the photo shoot can have a lower deletion score than a second photo in the photo shoot based on values of preservation weighing factors and/or deletion weighing factors of the first photo and the second photo. For example, the first photo in the photo shoot can have a lower deletion score than a second photo in the photo shoot in response to the first photo being determined to be more similar to example image files identified by the user for preservation than the second photo; in response to the first photo being determined to be more similar to example image files posted to social media than the second photo; in response to the action pose and/or group action pose being determined to be attempted more successfully than the second photo and/or being determined to be successfully executed by a higher number of people than the second photo; in response to detecting that a greater number of people in the first photo are smiling and/or are conveying the same type of facial expression than people in the second photo; in response to detecting that a greater number of people in the first photo are not blinking than people in the second photo; in response to detecting that the first photo and the second photos are attempted jumping photos and that the average distance of each person from the ground in the first photo is greater than average distance of each person from the ground in the second photo; in response to detecting that the first photo and the second photos are attempted jumping photos and that the average deviation of each person from the mean distance, calculated for the distances of all people from the ground in the first photo, is less than the average deviation of each person from the mean distance, calculated for the distances of all people from the ground in the second photo; in response to determining that the first photo includes less faces that are cropped and/or obscured than in the second photo; and/or based on other factors as discussed herein.

Other embodiments of GUI 145 may display deletion criteria prompts 242 and/or deletion confirmation prompts 244 in accordance with a different layout, in accordance with multiple displays displayed at different times, and/or with additional prompts not illustrated in FIGS. 3A-4F.

In various embodiments, a client device includes at least one processor and a memory that stores application data for a plurality of applications. The memory further stores executable instructions that, when executed by the client device, cause the client device to determine to perform a deletion evaluation function. A set of deletion candidate data is extracted from the application data of at least one of the plurality of applications in response to determining to perform the deletion evaluation function. A subset of the set of deletion candidate data for deletion is generated by selecting ones of the set of deletion candidate data that compare favorably to deletion criteria data. Deletion of the subset of the set of deletion candidate data from the memory is facilitated.

Figure 5:
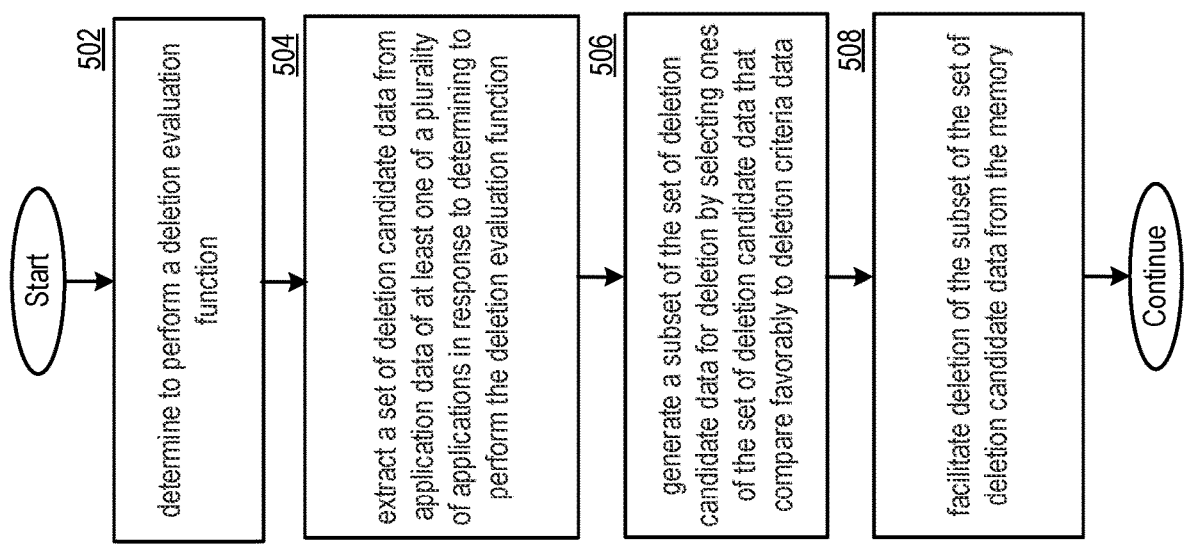
FIG. 5 is a logic diagram of an example of a method of selecting application data for deletion in accordance with the present invention.

FIG. 5 presents a method for execution by a client device that includes at least one processor and memory. The memory can store executable instructions that, when executed by the client device, cause the client device to perform the steps of FIG. 5. In some embodiments, the memory stores executable instructions in application data for a deletion service application installed on the client device. The memory can further store application data for a plurality of other applications stored on the client device. The client device can perform the steps of FIG. 5 in conjunction with the execution of the deletion service application by the at least one processor of the client device.

Step 502 includes determining to perform a deletion evaluation function. For example, this can include determining a predetermined time interval has elapsed, can be in determined based on user input to a GUI of the deletion service application in response to a prompt displayed by the GUI, and/or can be determined in response to determining deletion criteria, entered by the user via a GUI of the deletion service application in response to a prompt displayed by the GUI, has been met. This can include determining a current available memory capacity of the memory of the client device compares unfavorably to a memory capacity requirement of the client device and/or a desired available memory capacity indicated by the user in deletion criteria via the GUI.

Step 504 includes extracting a set of deletion candidate data from application data of at least one of the plurality of applications in response to determining to perform the deletion evaluation function. This can include extracting a plurality of data files from the application data. This can include comparing metadata of the application data to deletion criteria entered by the user via a GUI of the deletion service application, and extracting only data files that are determined to compare favorably to the deletion criteria based on the metadata. This metadata can include access history of data files, originating source data of data files, user account data associated with the application installed on the client device, or other information that indicates whether a data file should be deleted and/or whether content of the data file should be evaluated to determine whether the data file should be deleted.

Step 506 includes generating a subset of the set of deletion candidate data for deletion by selecting ones of the deletion candidate data that compare favorably to deletion criteria data. This can include comparing each of the set of deletion candidate data to automatic preservation factors and/or automatic deletion factors of the deletion criteria data determined by the user via user input to a GUI of the deletion service application, where data files and/or applications are included in subset of the set of deletion candidate data in response to comparing favorably to at least one of the automatic deletion factors and/or in response to comparing unfavorably to all of the automatic preservation factors. Generating the subset of the set of deletion candidate data can include performing a deletion scoring function on data files of the set of deletion candidate data to generate deletion scores for some or all of the data files. Generating the subset of the set of deletion candidate data can include performing a deletion scoring function on one or more of the plurality of applications indicated in the set of deletion candidate data to generate deletion scores for one or more of the plurality of applications. The deletion scoring function can be a function of a plurality of deletion weighing factors of the deletion criteria data that are selected by the user via the GUI, and a plurality of corresponding weights that are selected by the user via the GUI. The deletion scoring function can be a function of a plurality of preservation weighing factors of the deletion criteria data that are selected by the user via the GUI, a plurality of corresponding weights that are selected by the user via the GUI. Performing the deletion scoring function can include computing values for each of the plurality of preservation weighing factors and/or deletion weighing factors, and can further include summing the products of these values with the respective weights. Generating the subset of the set of deletion candidate data can include ranking data files and/or applications by their respective deletion score, and determining to delete data files and/or applications with highest ranked deletions scores. Generating the subset of the set of deletion candidate data can further include determining to a number delete data files with highest ranked deletions scores to meet a deletion quota, determined based on a difference between current available memory capacity and a desired available memory capacity. Generating the subset of the set of deletion candidate data can include determining sets of identical and/or redundant data files and/or applications by performing a similarity function, and selecting one data file and/or application in each set of the sets of identical and/or redundant data files and/or applications to be preserved, and identifying the remaining data files and/or applications for deletion.

Step 508 includes facilitating deletion of the subset of the set of deletion candidate data from the memory. This can include transferring some or all of the subset of the set of deletion candidate data to an external memory and/or archive storage system by transmitting some or all of the subset of the set of deletion candidate data via a network and/or via a wired or wireless communication interface of the client device.

In some embodiments, the memory further stores second executable instructions that, when executed by the at least one processor, cause the processor to perform further steps of the method. These further steps can include receiving, via a receiver of the client device, the application data of the deletion service application via a network, where the application data of the deletion service application is transmitted to the client device by a deletion service server system via the network. These further steps can include installing the application data of the deletion service application. These further steps can include displaying the GUI of the deletion service application in response to user input corresponding to the selection of the deletion service application from the plurality of applications.

The steps performed by the at least one processor in conjunction with execution of the deletion service application can include receiving user input generated in response to a prompt displayed via the GUI of the deletion service application. The deletion evaluation function can be performed in response to the user input indicating a selection to perform the deletion evaluation function. The steps can include displaying, via the GUI of the deletion service application, a prompt to select the deletion criteria data from a plurality of deletion criteria options. The steps can include determining the deletion criteria data in response to the user input generated in response to the prompt.

The steps performed by the at least one processor in conjunction with execution of the deletion service application can include displaying, via the GUI of the deletion service application, the subset of the set of deletion candidate data. The steps can include displaying, via the GUI of the deletion service application, a prompt to select whether each of the subset of deletion candidate data be preserved or deleted. The steps can include receive user input in response to the prompt indicating a second subset of the subset of the set of deletion candidate data selected for deletion, where deletion is facilitated for only ones of the second subset of the subset of the set of deletion candidate data. The user can further select, via the GUI, whether each of the subset of deletion candidate data be transmitted to an archive storage system and/or be stored in an external memory device. The steps can include facilitating the transfer of some or all of the second subset of the subset of the set of deletion candidate data selected for deletion to the archive storage system and/or external memory device via the network and/or via a wired and/or wireless communication interface.

In various embodiments, at least one of the plurality of applications includes a media application storing a plurality of media files. Extracting a set of deletion candidate data includes extracting a subset of the plurality of media files. The subset of the set of deletion candidate data can include at least one of the subset of the plurality of media files.

In various embodiments, the deletion criteria data indicates a media file similarity threshold. Performing the deletion evaluation function can include generating a plurality of similarity values for a plurality of sets of the subset of media files by performing a similarly function on each of the plurality of sets of the subset of media files. A set of similar media files with a corresponding one of the plurality of similarity values that compares favorably to the similarity threshold can be identified. One of the set of similar media files can be automatically selected to be preserved. Remaining ones of the set of similar media files can be automatically selected to be included in the subset of the set of deletion candidate data to be deleted. In various embodiments, the similarity threshold corresponds to a duplicate content condition, and the set of similar media files correspond to media files that are determined to contain duplicate content. In various embodiments, the set of similar media files correspond to media files that have at least one difference in content. For example, the set of similar media files can be otherwise determined to be redundant despite the at least one difference in content.

In various embodiments, the set of similar media files are photographs and/or videos captured by a camera of the client device. Performing the similarity function can include comparing timestamp data of a plurality of photographs and/or videos. The similarity threshold includes a threshold time interval, and the set of similar media files are selected in response to determining the corresponding ones of the plurality of photographs and/or videos were captured by the client device in an amount of time that compares favorably to the threshold time interval.

In various embodiments, the deletion criteria data includes a media file sharing condition. At least one of the subset of the set of deletion candidate data are selected for deletion in response to determining that the media files of the subset of the set of deletion candidate data were transmitted, via a network, in conjunction with a social media application of the plurality of applications and/or a messaging application of the plurality of applications.

In various embodiments, the deletion criteria data includes a screenshot condition. At least one of the subset of the set of deletion candidate data are selected for deletion in response to determining that the media files of the subset of the set of deletion candidate data correspond to screenshots captured by the client device.

In various embodiments, the deletion criteria data includes a front-facing camera condition. At least one of the subset of the set of deletion candidate data are selected for deletion in response to determining that the media files of the subset of the set of deletion candidate data correspond to photographs captured by a front-facing camera of the client device.

In various embodiments, the deletion criteria data includes an external source condition. At least one of the subset of the set of deletion candidate data are selected for deletion in response to determining that the media files of the subset of the set of deletion candidate data correspond to photographs that were not captured by a camera of the client device.

In various embodiments, preservation condition data indicates at least one favorable feature. The deletion criteria data is based on an inverse of preservation condition data. The subset of the set of deletion candidate data are selected for deletion in response to determining that the subset of the set of deletion candidate data compares unfavorably to the preservation condition data. In some embodiments, all of the set of deletion candidate data that is determined to compare unfavorably to the preservation condition data is automatically included in the subset of the set of deletion candidate data. In other embodiments, at least one of the set of deletion candidate data that compares unfavorably to the preservation condition data is not selected to be included in the subset of the set of deletion candidate data.

In various embodiments, the deletion candidate data corresponds to photographs. The method performed in conjunction with execution of the deletion service application by the at least one processor can include generating feature detection data for each of the plurality of photographs by performing a computer vision function on the each of the plurality of photographs. The subset of deletion candidate data is generated by selecting ones of the plurality of photographs with feature detection data that indicates the at least one favorable feature is not included in the ones of the plurality of photographs.

In various embodiments, the at least one favorable feature includes a face, and the subset of the set of deletion candidate data are selected for deletion in response to determining that the feature detection data of the ones of the plurality of photographs indicate the ones of the plurality of photographs do not include at least one face. In some embodiments, only photographs determined to have been taken by a front-facing camera of the client device that are further determined to not include at least one face are selected for deletion. In various embodiments, the least one favorable feature includes a face conveying a positive emotion, and the subset of the set of deletion candidate data are selected for deletion in response to determining that the feature detection data of the ones of the plurality of photographs indicate the ones of the plurality of photographs do not include at least one face conveying a positive emotion. In various embodiments, the least one favorable feature includes a plurality of faces of a plurality of social contacts of a user of the client device. The subset of the set of deletion candidate data are selected for deletion in response to determining that the feature detection data of the ones of the plurality of photographs indicate the ones of the plurality of photographs do not include at least one of the plurality of faces of the plurality of social contacts.

In various embodiments, the deletion criteria data indicates at least one unfavorable feature. The subset of deletion candidate data is generated by selecting ones of the plurality of photographs with feature detection data, generated by performing the computer vision function on photographs of the deletion candidate data, that indicates the at least one unfavorable feature is included in the ones of the plurality of photographs.

In various embodiments, the least one unfavorable feature corresponds to a failure of an action shot. The subset of the set of deletion candidate data are selected for deletion in response to determining that the feature detection data of the ones of the plurality of photographs indicate the ones of the plurality of photographs include the failure of the action shot. In various embodiments, generating the feature detection data includes identifying a set of the plurality of photographs corresponds to an attempt at the action shot. At least one of the set of the plurality of photographs corresponds to a success of the action shot. The ones of the plurality of photographs included in the subset of deletion candidate data are identified from the set of the plurality of photographs based on determining the ones of the plurality of photographs correspond to the failure of the action shot.

In various embodiments, the set of the plurality of photographs determined to correspond to an attempt at an action shot are identified based on identifying a plurality of people in each of the set of the plurality of photographs and further based on identifying at least a threshold proportion of the plurality of people are jumping. The at least one of the set of the plurality of photographs corresponding to the success of the action shot includes every one of the plurality of people jumping, and the ones of the plurality of photographs included in the subset of deletion candidate data are identified by determining at least one of the plurality of people is not jumping in the ones of the plurality of photographs. In various embodiments, the at least a threshold proportion of the plurality of people detected to be jumping in the each of the set of the plurality of photographs by identifying a horizon line in the each of the set of the plurality of photographs, and by determining that the at least a threshold proportion of the plurality of people are entirely above the horizon line in the set of the plurality of photographs. Determining at least one of the plurality of people is not jumping in the ones of the plurality of photographs includes determining that a portion of the at least one of the plurality of people is below the horizon line in the ones of the plurality of photographs.

In various embodiments, the least one unfavorable feature includes a face conveying a negative emotion. The subset of the set of deletion candidate data are selected for deletion in response to determining that the feature detection data of the ones of the plurality of photographs indicate the ones of the plurality of photographs include at least one face conveying the negative emotion.

In various embodiments, the least one unfavorable feature includes a face of an unfavorable person. The subset of the set of deletion candidate data are selected for deletion in response to determining that the feature detection data of the ones of the plurality of photographs indicate the ones of the plurality of photographs include the face of the unfavorable person.

In various embodiments, the method performed in conjunction with execution of the deletion service application via the at least one processor includes extracting a first plurality of social contacts of the user from user profile information for the user included in application data of at least one of the plurality of applications that corresponds to a social media application at a first time. The method includes extracting a second plurality of social contacts of the user from user profile information for the user included in application data of at least one of the plurality of applications that corresponds to a social media application at a second time that is after the first time. The unfavorable person is identified by determining one of the first plurality of social contacts is not in the second plurality of social contacts. The method can include determining the face of the unfavorable person based on at least one photograph posted to the social media application by the unfavorable person via a client device associated with the unfavorable person, such as a profile picture associated with the unfavorable person. The method can include determining the face of the unfavorable person based on a picture stored in a contacts application and/or messaging application as a profile picture for the undesirable person in the contacts application or the messaging application.

In various embodiments, the method performed in conjunction with execution of the deletion service application via the at least one processor includes determining the user is in a relationship with a significant other by extracting first romantic relationship data from user profile information for the user included in application data of at least one of the plurality of applications that corresponds to a social media application at a first time. The method includes determining the user is no longer in the relationship with the significant other by extracting second romantic relationship data the user profile information for the user at a second time that is after the first time. The method includes identifying the unfavorable person based on determining the user is no longer in the relationship with the significant other, where the unfavorable person corresponds to the significant other.

In various embodiments, the method includes extracting contact information of the unfavorable person from one of a plurality of contact profiles included in application data of one of the plurality of applications that corresponds to a contact application, where the unfavorable person is associated with the one of the plurality of contact profiles. The method includes utilizing the contact information to extract a plurality of text messages that were sent by the unfavorable person from application data of one of the plurality of applications that corresponds to a text messaging application. The method includes generating the subset of the set of deletion candidate data to include the plurality of text messages that were sent by the unfavorable person in the subset of the set of deletion candidate data based on the deletion criteria data indicating that text messages of any social contact determined to be an unfavorable person be deleted.

In various embodiments, the subset of the set of deletion candidate data includes an entirety of application data for one of the plurality of applications. Facilitating deletion of the subset of the set of deletion candidate data includes facilitating uninstalling of the one of the plurality of applications. In various embodiments, the deletion criteria data includes an unused application condition. The entirety of application data for the one of the plurality of applications is included in the subset of the set of deletion candidate data in response to determining the one of the plurality of applications has not been opened for at least a threshold amount of time.

In various embodiments, the deletion criteria data includes a duplicate application service condition. The method includes determining that a new application has been installed to the client device and further includes determining one of a plurality of service types of the new application. The entirety of application data for the one of the plurality of applications is included in the subset of the set of deletion candidate data in response to determining the one of the plurality of applications corresponds to a same one of the plurality of service types as the new one of the plurality of applications.

In various embodiments, the method includes determining that frequency of use of another one of the plurality of applications has increased by at least a threshold amount, and determining one of a plurality of service types of the another one of the plurality of applications. The entirety of application data for the one of the plurality of applications is included in the subset of the set of deletion candidate data in response to determining the one of the plurality of applications corresponds to a same one of the plurality of service types as the another one of the plurality of applications.

In various embodiments, the deletion criteria data includes a profile deletion criteria. The method includes determining a user profile associated with the one of the plurality of applications of the client applications has been deleted. The entirety of application data for the one of the plurality of applications is included in the subset of the set of deletion candidate data in response to determining the user profile associated with the one of the plurality of applications of the client applications has been deleted.

In various embodiments, the method includes determine a subscription associated with the one of the plurality of applications of the client applications has been cancelled. The entirety of application data for the one of the plurality of applications is included in the subset of the set of deletion candidate data in response to determining the subscription associated with the one of the plurality of applications of the client applications has been cancelled.

In various embodiments, the one of the plurality of applications corresponds to a dating application. The method includes determining a relationship status of a user of the client device has changed from single to in a relationship. The entirety of application data for the one of the plurality of applications is included in the subset of the set of deletion candidate data in response to determining the relationship status of a user of the client device has changed from single to in a relationship.

In various embodiments, the relationship status of a user of the client device is determined based on extracting romantic relationship data from user profile information for the user included in application data of at least one of the plurality of applications that corresponds to a social media application. The relationship status of a user of the client device is determined to have changed from single to in a relationship when romantic relationship data indicates the relationship status has changed from single to in a relationship.

In various embodiments, determining the relationship status of a user of the client device has changed from single to in a relationship includes extracting messaging data in application data of at least one of the plurality of applications that corresponds to a messaging application. The user is determined to have has begun a relationship with one of a plurality of social contacts based on evaluating messages exchanged between the user and the one of the plurality of social contacts in the messaging data. In various embodiments, determining the user has begun a relationship with one of a plurality of social contacts includes determining a frequency of the messages exchanged between the user and one of a plurality of social contacts has increased by at least a threshold amount. In various embodiments, determining the user has begun a relationship with one of a plurality of social contacts includes determining a frequency of the messages exchanged between the user and one of a plurality of social contacts has increased to be greater than a plurality of frequencies of messages exchanged between the user and other ones of a plurality of social contacts by at least a threshold amount. In various embodiments, determining the user has begun a relationship with one of a plurality of social contacts includes performing a natural language processing function on text of messages exchanged between the user and the one of a plurality of social contacts, and further includes determining a frequency of use of at least one term of endearment has increased by at least a threshold amount. In various embodiments, determining the user has begun a relationship with one of a plurality of social contacts includes determining a frequency of use of at least one emoticon determined to be associated with romance has increased by at least a threshold amount in the messages exchanged between the user and the one of a plurality of social contacts. In various embodiments, determining the user has begun a relationship with one of a plurality of social contacts includes determining a frequency of photographs included in the messages exchanged between the user and the one of a plurality of social contacts has increased by at least a threshold amount. In various embodiments, determining the user has begun a relationship with one of a plurality of social contacts includes determining a frequency of photographs, included in messages sent by the client device to the one of a plurality of social contacts, that were determined to have been taken by a front-facing camera of the client device has increased by at least a threshold amount. In various embodiments, determining the user has begun a relationship with one of a plurality of social contacts includes performing a computer vision function on each of the photographs to determine whether the user is included in ones of the photographs, and further includes determining that a frequency of photographs included in messages sent by the client device to the one of a plurality of social contacts that are determined to include the user has increased by at least a threshold amount.

In various embodiments, the method performed in conjunction with execution of the deletion service application via the at least one processor includes performing a deletion scoring function on each of the set of deletion candidate data to generate a set of deletion scores corresponding to the set of deletion candidate data. Generating the subset of the set of deletion candidate data for deletion includes selecting ones of the set of deletion candidate data with corresponding ones of the set of deletion scores that compare favorably to a deletion scoring threshold of the deletion criteria data. In various embodiments, the method includes generating a ranking of the set of deletion candidate data in accordance with the set of deletion scores, where generating the subset of the set of deletion candidate data for deletion includes selecting ones of the set of deletion candidate data with highest ranked ones of the set of deletion scores in the ranking.

In various embodiments, the method includes determining a data size of the each of the set of deletion candidate data. A minimum number of the ones of the set of deletion candidate data with highest ranked ones of the set of deletion scores in the ranking is identified, where the minimum number corresponds to the minimum number of these highest ranked ones of the set of deletion candidate data that have a total data size that compares favorably to a deletion data size requirement of the deletion criteria data. The total data size is the sum of data sizes of each of the minimum number of the ones of the set of deletion candidate data with the highest ranked ones of the set of deletion scores. The subset of the set of deletion candidate data by selecting only the minimum number of the ones of the set of deletion candidate data with the highest ranked ones of the set of deletion scores.

In various embodiments, the deletion scoring function is a function of on at least one of: an age of the each of the set of deletion candidate data, a frequency of access of the each of the set of deletion candidate data, an amount of time since a last access of the each of the set of deletion candidate data, or a data size of the each of the set of deletion candidate data.

It is noted that terminologies as may be used herein such as bit stream, stream, signal sequence, etc. (or their equivalents) have been used interchangeably to describe digital information whose content corresponds to any of a number of desired types (e.g., data, video, speech, text, graphics, audio, etc. any of which may generally be referred to as 'data').

As may be used herein, the terms "substantially" and "approximately" provides an industry-accepted tolerance for its corresponding term and/or relativity between items. For some industries, an industry-accepted tolerance is less than one percent and, for other industries, the industry-accepted tolerance is 10 percent or more. Industry-accepted tolerances correspond to, but are not limited to, component values, integrated circuit process variations, temperature variations, rise and fall times, thermal noise, dimensions, signaling errors, dropped packets, temperatures, pressures, material compositions, and/or performance metrics. Within an industry, tolerance variances of accepted tolerances may be more or less than a percentage level (e.g., dimension tolerance of less than +/−1%).

As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may be used herein, one or more claims may include, in a specific form of this generic form, the phrase "at least one of a, b, and c" or of this generic form "at least one of a, b, or c", with more or less elements than "a", "b", and "c". In either phrasing, the phrases are to be interpreted identically. In particular, "at least one of a, b, and c" is equivalent to "at least one of a, b, or c" and shall mean a, b, and/or c. As an example, it means: "a" only, "b" only, "c" only, "a" and "b", "a" and "c", "b" and "c", and/or "a", "b", and "c".

As may also be used herein, the terms "processing system", "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, processing system, and/or processing unit may be, or further include, memory and/or an integrated memory element, which may be a single memory device, a plurality of memory devices, and/or embedded circuitry of another processing module, module, processing circuit, processing system, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, processing system, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, processing system, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, processing system, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid-state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A client device comprising:
   at least one processor; and
   a memory that stores:
      application data for a plurality of applications;
      first executable instructions that, when executed by the at least one processor, cause the client device to:
      determine to perform a deletion evaluation function;
      extract a set of deletion candidate data from the application data of at least one of the plurality of applications in response to determining to perform the deletion evaluation function;
      generate feature detection data for each of a plurality of photographs of the set of deletion candidate data by performing a computer vision function on the each of the plurality of photographs;
      generate a subset of the set of deletion candidate data for deletion by selecting ones of the set of deletion candidate data that compare favorably to deletion criteria data, wherein the deletion criteria data indicates at least one unfavorable feature and wherein the subset of the set of deletion candidate data is generated by selecting ones of the plurality of photographs with feature detection data that indicates the at least one unfavorable feature is included in the ones of the plurality of photographs; and
      facilitate deletion of the subset of the set of deletion candidate data from the memory.

2. The client device of claim 1, wherein the memory further stores second executable instructions that, when executed by the at least one processor, cause the client device to:
- receive, via a receiver of the client device, the application data of a deletion service application via a network, wherein the application data of the deletion service application is transmitted to the client device by a deletion service application server system via the network;
- install the application data of the deletion service application; and
- display a graphical user interface of the deletion service application in response to user input corresponding to a selection of the deletion service application from the plurality of applications;
- wherein the first executable instructions are executed by the at least one processor in response to the selection of the deletion service application from the plurality of applications.

3. The client device of claim 2, wherein the first executable instructions, when executed by the at least one processor, further cause the client device to:
- display, via the graphical user interface, the subset of the set of deletion candidate data;
- display, via the graphical user interface, a prompt to select whether each of the subset of the set of deletion candidate data be one of: preserved or deleted; and
- receiving user input in response to the prompt indicating a second subset of the subset of the set of deletion candidate data selected for deletion, wherein deletion is facilitated for only ones of the second subset of the subset of the set of deletion candidate data.

4. The client device of claim 1, wherein the at least one of the plurality of applications includes a media application storing a plurality of media files, wherein extracting the set of deletion candidate data includes extracting a subset of the plurality of media files, and wherein the subset of the set of deletion candidate data includes at least one of the subset of the plurality of media files.

5. The client device of claim 4, wherein the deletion criteria data indicates a media file similarity threshold, and wherein the first executable instructions, when executed by the at least one processor, further cause the client device to:
- generate a plurality of similarity values for a plurality of sets of the subset of media files by performing a similarly function on each of the plurality of sets of the subset of media files;
- identify a set of similar media files with a corresponding one of the plurality of similarity values that compares favorably to the media file similarity threshold;
- select one of the set of similar media files to be preserved; and
- select remaining ones of the set of similar media files to be included in the subset of the set of deletion candidate data to be deleted.

6. The client device of claim 5, wherein the set of similar media files are photographs captured by a camera of the client device, wherein performing the similarity function includes comparing timestamp data of a plurality of photographs, wherein the similarity threshold includes a threshold time interval, and wherein the set of similar media files are selected in response to determining the corresponding ones of the plurality of photographs were captured by the client device in an amount of time that compares favorably to the threshold time interval.

7. The client device of claim 4, wherein the deletion criteria data includes a media file sharing condition, and wherein the subset of the set of deletion candidate data are selected for deletion in response to determining that the media files of the subset of the set of deletion candidate data were transmitted, via a network, in conjunction with one of: a social media application of the plurality of applications or a messaging application of the plurality of applications.

8. The client device of claim 4, wherein the deletion criteria data includes an external source condition, and wherein the subset of the set of deletion candidate data are selected for deletion in response to determining that the media files of the subset of the set of deletion candidate data correspond to photographs that were not captured by a camera of the client device.

9. The client device of claim 1, wherein preservation condition data indicates at least one favorable feature, wherein the deletion criteria data is further based on an inverse of the preservation condition data, and wherein the first executable instructions, when executed by the at least one processor, further cause the client device to:
- wherein the subset of the set of deletion candidate data is further generated by selecting ones of the plurality of photographs with feature detection data that indicates the at least one favorable feature is not included in the ones of the plurality of photographs.

10. The client device of claim 9, wherein the least one favorable feature includes a plurality of faces of a plurality of social contacts of a user of the client device, and wherein the subset of the set of deletion candidate data are selected for deletion in response to determining that the feature detection data of the ones of the plurality of photographs indicate the ones of the plurality of photographs do not include at least one of the plurality of faces of the plurality of social contacts.

11. The client device of claim 1, wherein the least one unfavorable feature corresponds to a failure of an action shot, and wherein generating the feature detection data includes:
- identifying a set of the plurality of photographs corresponds to an attempt at the action shot, wherein at least one of the set of the plurality of photographs corresponds to a success of the action shot; and
- identifying the ones of the plurality of photographs from the set of the plurality of photographs based on determining the ones of the plurality of photographs correspond to the failure of the action shot.

12. The client device of claim 11, wherein the set of the plurality of photographs are identified based on identifying a plurality of people in each of the set of the plurality of photographs and further based on identifying at least a threshold proportion of the plurality of people are jumping, wherein the at least one of the set of the plurality of photographs corresponding to the success of the action shot includes every one of the plurality of people jumping, and wherein the ones of the plurality of photographs are identified by determining at least one of the plurality of people is not jumping in the ones of the plurality of photographs;
- wherein identifying the at least a threshold proportion of the plurality of people are jumping in the each of the set of the plurality of photographs includes identifying a horizon in the each of the set of the plurality of photographs and further includes determining that the at least a threshold proportion of the plurality of people are entirely above the horizon in the set of the plurality of photographs, and wherein determining at least one of the plurality of people is not jumping in the ones of the plurality of photographs includes determining that a portion of the at least one of the plurality of people is below the horizon in the ones of the plurality of photographs.

13. The client device of claim 1, wherein the least one unfavorable feature includes a face of an unfavorable person, and wherein the subset of the set of deletion candidate data are selected for deletion in response to determining that the feature detection data of the ones of a plurality of photographs in the set of deletion candidate data indicate the ones of the plurality of photographs include the face of the unfavorable person; and
  wherein the first executable instructions, when executed by the at least one processor, cause the client device to:
    determine a user of the client device is in a relationship with a significant other by extracting first romantic relationship data from user profile information for the user included in application data of at least one of the plurality of applications that corresponds to a social media application at a first time;
    determine the user is no longer in the relationship with the significant other by extracting second romantic relationship data the user profile information for the user at a second time that is after the first time;
    identify the unfavorable person based on determining the user is no longer in the relationship with the significant other, wherein the unfavorable person corresponds to the significant other; and
    determine the face of the unfavorable person based on at least one photograph posted to the social media application by the unfavorable person via another client device associated with the unfavorable person.

14. The client device of claim 1, wherein the subset of the set of deletion candidate data includes an entirety of application data for one of the plurality of applications, and wherein facilitating deletion of the subset of the set of deletion candidate data includes facilitating uninstalling of the one of the plurality of applications.

15. The client device of claim 14, wherein the first executable instructions, when executed by the at least one processor, cause the client device to:
  determine that frequency of use of another one of the plurality of applications has increased by at least a threshold amount; and
  determine one of a plurality of service types of the another one of the plurality of applications;
  wherein the entirety of application data for the one of the plurality of applications is included in the subset of the set of deletion candidate data in response to determining the one of the plurality of applications corresponds to a same one of the plurality of service types as the another one of the plurality of applications.

16. The client device of claim 14, wherein the one of the plurality of applications corresponds to a dating application, and wherein the first executable instructions, when executed by the at least one processor, cause the client device to:
  determine a relationship status of a user of the client device has changed from single to in a relationship, wherein determining the relationship status of the user of the client device has changed from single to in a relationship includes:
    extracting messaging data in application data of at least one of the plurality of applications that corresponds to a messaging application; and
    determining the user has begun a relationship with one of a plurality of social contacts based on evaluating the messaging data for messages exchanged between the user and the one of the plurality of social contacts to determine a frequency of photographs that were taken by a front-facing camera of the client device that are included in messages sent by the client device to the one of the plurality of social contacts has increased by at least a threshold amount;
  wherein the entirety of application data for the dating application is included in the subset of the set of deletion candidate data in response to determining the relationship status of the user of the client device has changed from single to in a relationship.

17. The client device of claim 1, wherein the least one unfavorable feature corresponds to a rule of thirds failure, and wherein generating the feature detection data includes:
  identifying the ones of the plurality of photographs from the plurality of photographs where a subject does not favorably intersect with a rule of thirds grid.

18. The client device of claim 1, wherein the first executable instructions, when executed by the at least one processor, further cause the client device to:
  perform a deletion scoring function on each of the set of deletion candidate data to generate a set of deletion scores corresponding to the set of deletion candidate data;
  generate a ranking of the set of deletion candidate data in accordance with the set of deletion scores;
  determine a minimum number of the ones of the set of deletion candidate data with highest ranked ones of the set of deletion scores in the ranking that are required such that a total data size compares favorably to a deletion data size requirement of the deletion criteria data, wherein the total data size is a sum of data sizes of each of the minimum number of the ones of the set of deletion candidate data with the highest ranked ones of the set of deletion scores; and
  generating the subset of the set of deletion candidate data by selecting only the minimum number of the ones of the set of deletion candidate data with the highest ranked ones of the set of deletion scores.

19. A method for execution by a client device that includes at least one processor, the method comprising:
  determining to perform a deletion evaluation function;
  extracting a set of deletion candidate data from application data of at least one of a plurality of applications stored in memory of the client device in response to determining to perform the deletion evaluation function;
  generating feature detection data for each of a plurality of photographs of the set of deletion candidate data by performing a computer vision function on the each of the plurality of photographs;
  generating a subset of the set of deletion candidate data for deletion by selecting ones of the set of deletion candidate data that compare favorably to deletion criteria data, wherein the deletion criteria data indicates at least one unfavorable feature and wherein the subset of the set of deletion candidate data is generated by selecting ones of the plurality of photographs with feature detection data that indicates the at least one unfavorable feature is included in the ones of the plurality of photographs; and
  facilitating deletion of the subset of the set of deletion candidate data from the memory of the client device generate feature detection data for each of a plurality of photographs of the set of deletion candidate data by performing a computer vision function on the each of the plurality of photographs;

extract a set of deletion candidate data from the application data of at least one of the plurality of applications in response to determining to perform the deletion evaluation function, wherein the deletion criteria data indicates at least one unfavorable feature and wherein the subset of the set of deletion candidate data is generated by selecting ones of the plurality of photographs with feature detection data that indicates the at least one unfavorable feature is included in the ones of the plurality of photographs;

generate a subset of the set of deletion candidate data for deletion by selecting ones of the set of deletion candidate data that compare favorably to deletion criteria data; and facilitate deletion of the subset of the set of deletion candidate data from the memory.

20. The method of claim 19, wherein the least one unfavorable feature corresponds to a rule of thirds failure, and wherein generating the feature detection data includes:

identifying the ones of the plurality of photographs of the plurality of photographs where a subject does not favorably intersect with a rule of thirds grid.

\* \* \* \* \*